(12) United States Patent
Mouhouche et al.

(10) Patent No.: US 9,432,153 B2
(45) Date of Patent: Aug. 30, 2016

(54) MAPPING CELLS TO SYMBOLS

(71) Applicant: SAMSUNG ELECTRONICS CO., LTD., Suwon-si (KR)

(72) Inventors: Belkacem Mouhouche, Staines-upon-Thames (GB); Daniel Ansorregui, Staines-upon-Thames (GB); Alain Mourad, Staines-upon-Thames (GB); Hong-sil Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 14/301,437

(22) Filed: Jun. 11, 2014

(65) Prior Publication Data

US 2014/0369364 A1 Dec. 18, 2014

(30) Foreign Application Priority Data

Jun. 12, 2013 (GB) .................................. 1310473.2
Sep. 11, 2013 (KR) ........................ 10-2013-0109325

(51) Int. Cl.
*H04J 3/24* (2006.01)
*H04L 5/00* (2006.01)
(Continued)

(52) U.S. Cl.
CPC ................ *H04L 5/001* (2013.01); *H04L 1/00* (2013.01); *H04L 5/0021* (2013.01); *H04L 5/0023* (2013.01); *H04L 5/0039* (2013.01); *H04L 5/0048* (2013.01); *H04L 27/2602* (2013.01); *H04L 27/2634* (2013.01); *H04N 21/2383* (2013.01); *H04N 21/4382* (2013.01); *H04N 21/4385* (2013.01); *H04N 21/6131* (2013.01)

(58) Field of Classification Search
CPC ..... H04L 29/06; H04L 21/61; H04L 21/643; H04L 5/001; H04L 1/00; H04L 5/0023; H04L 5/0039
USPC .......................................................... 370/474
See application file for complete search history.

(56) References Cited

U.S. PATENT DOCUMENTS 8,254,245 B2  8/2012  Kim et al.
8,638,654 B2  1/2014  Kim et al.
(Continued)

FOREIGN PATENT DOCUMENTS

EP          2 222 007 B1     5/2012
KR   10-2008-0096358 A      10/2008

OTHER PUBLICATIONS

Communication dated Oct. 2, 2014 issued by the Int. Searching Authority in counterpart Int. Application No. PCT/KR2014/005157 (PCT/ISA/210).

(Continued)

*Primary Examiner* — Sai-Ming Chan
(74) *Attorney, Agent, or Firm* — Sughrue Mion, PLLC

(57) ABSTRACT

A method for mapping cells onto symbols is provided. The cells include two or more cells processed by pre-coding in groups, the symbols include N symbols in a time-sequence, and each symbol includes M carriers in a frequency-order. The method comprises: mapping each cell to a carrier of a symbol; and frequency interleaving the carriers of each symbol. The mapping and the frequency interleaving are performed such that, following the frequency interleaving, the cells of a group of pre-coded cells are each mapped to carriers having the same carrier frequency or to carriers having carrier frequencies differing by no more than a threshold.

22 Claims, 21 Drawing Sheets

(51) Int. Cl.
*H04L 1/00* (2006.01)
*H04L 27/26* (2006.01)
*H04N 21/2383* (2011.01)
*H04N 21/438* (2011.01)
*H04N 21/4385* (2011.01)
*H04N 21/61* (2011.01)

(56) References Cited

U.S. PATENT DOCUMENTS

| | | |
|---|---|---|
| 2009/0180459 A1 | 7/2009 | Orlik et al. |
| 2009/0190677 A1 | 7/2009 | Jokela et al. |
| 2010/0118800 A1 | 5/2010 | Kim et al. |
| 2011/0170631 A1 | 7/2011 | Kim et al. |
| 2012/0314786 A1* | 12/2012 | Atungsiri ............ H04L 27/3488 375/260 |
| 2013/0003758 A1 | 1/2013 | Atungsiri et al. |
| 2013/0028238 A1 | 1/2013 | Kim et al. |
| 2014/0016577 A1 | 1/2014 | Kim et al. |
| 2014/0314177 A1* | 10/2014 | Choi .................... H04B 7/0413 375/296 |

OTHER PUBLICATIONS

Communication dated Oct. 2, 2014 issued by the Int. Searching Authority in counterpart Int. Application No. PCT/KR2014/005157 (PCT/ISA/237).

Communication, dated Dec. 5, 2013, issued by the British Intellectual Property Office in counterpart British Patent Application No. 1310473.2.

\* cited by examiner

No Zig-Zag

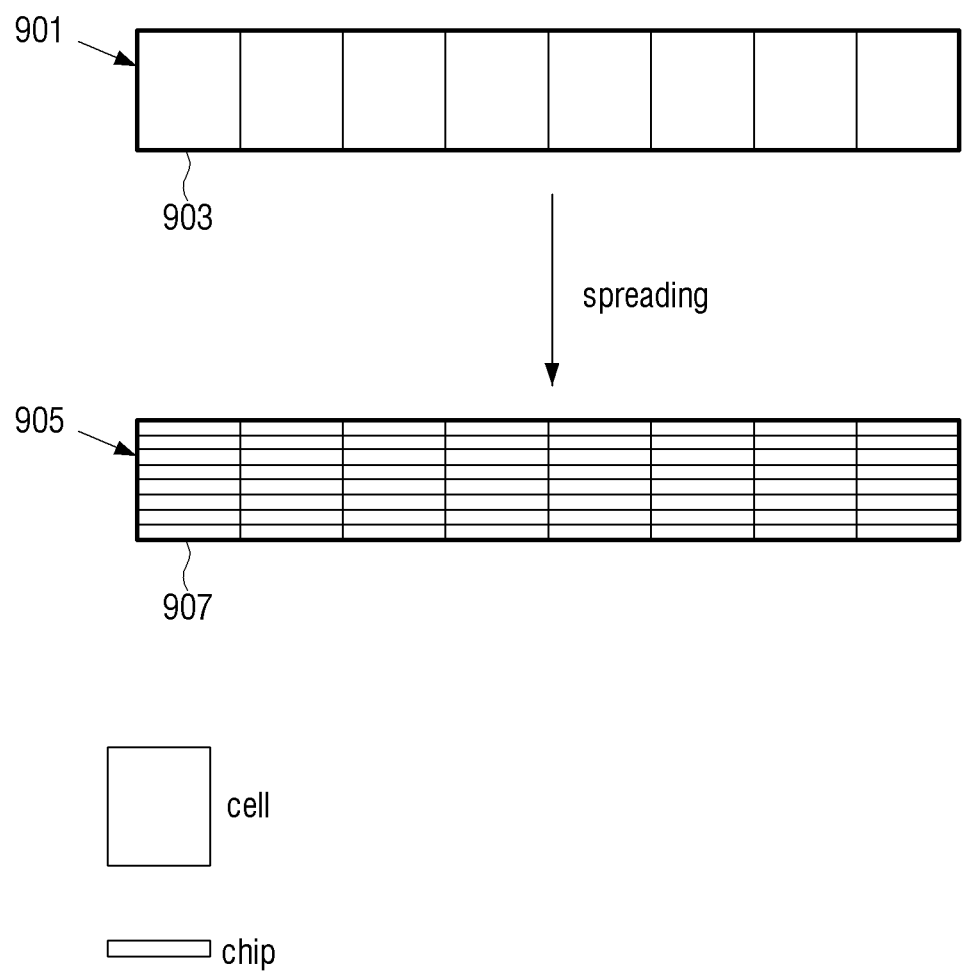

MAPPING CELLS TO SYMBOLS

CROSS-REFERENCE TO RELATED APPLICATIONS

This application claims priority from Korean Patent Application No. 10-2013-0109325, filed on Sep. 11, 2013, in the Korean Intellectual Property Office and U.K. Patent Application GB1310473.2 on Jun. 12, 2013, the disclosures of which are incorporated herein their entirety by reference.

BACKGROUND

1. Field

Apparatuses and methods consistent with exemplary embodiments relate to mapping/de-mapping cells to/from multi-carrier symbols, and more particularly, mapping/de-mapping physical layer (L1) signalling cells to/from preamble symbols (e.g. P2 symbols) in Digital Video Broadcasting (DVB).

2. Description of the Related Art

Digital broadcasting techniques allow various types of digital content, for example video and audio data, to be distributed to end users. A number of standards have been developed for this purpose, including a family of open standards developed and maintained by the Digital Video Broadcasting (DVB) Project and published by the European Telecommunications Standards Institute (ETSI).

One such standard is DVB-T2, which is described in various documents, including ETSI EN 302 755 V1.3.1, ("Digital Video Broadcasting (DVB); Frame structure channel coding and modulation for a second generation digital terrestrial television broadcasting system (DVB-T2)"), and Technical Specification ETSI TS 102 831 V1.2.1 ("Digital Video Broadcasting (DVB); Implementation guidelines for a second generation digital terrestrial television broadcasting system (DVB-T2)").

Another standard for digital broadcasting is DVB-NGH, which is described in various documents including ETSI EN 303 105 V1.1.1 ("Digital Video Broadcasting (DVB); Next Generation broadcasting system to Handheld physical layer specification (DVB-NGH)") and DVB Bluebook A160. DVB-NGH is designed for broadcasting digital content to handheld terminals, for example mobile telephones.

SUMMARY

One or more exemplary embodiments of the inventive concept address, solve and/or mitigate, at least partly, at least one of the problems and/or disadvantages associated with the related art, for example at least one of the problems and/or disadvantages described above. One or more exemplary embodiments of the inventive concept also provide at least one advantage over the related art, for example at least one of the advantages described below.

Various aspects of the inventive concept will be apparent from the descriptions below, or may be learned by practice of the exemplary embodiments.

In accordance with an aspect of an exemplary embodiment, there is provided a method for mapping cells onto symbols, wherein the cells include two or more cells processed by pre-coding in groups, the symbols include N symbols in a time-sequence, and each symbol includes M carriers in a frequency-order, where each of N and M is an integer greater than 0, the method including: mapping each cell to a carrier of a symbol; and frequency interleaving the carriers of each symbol, wherein the mapping and the frequency interleaving are performed such that, following the frequency interleaving, the cells of a group of pre-coded cells are each mapped to carriers having the same carrier frequency or to carriers having carrier frequencies differing by no more than a threshold.

In accordance with an aspect of another exemplary embodiment, there is provided a method for de-mapping cells from symbols, wherein the cells include two or more cells processed by pre-coding in groups, the symbols include N symbols in a time-sequence, and each symbol includes M carriers in a frequency-order, the method including: frequency de-interleaving the carriers of each symbol; and de-mapping cells from carriers of each symbol, wherein, prior to the frequency de-interleaving, the cells of a group of pre-coded cells are each mapped to carriers having the same carrier frequency or to carriers having carrier frequencies differing by no more than a threshold.

In accordance with an aspect of another exemplary embodiment, there is provided a method for mapping cells onto symbols, wherein the symbols include N symbols in a time-sequence, and each symbol includes M carriers in a frequency-order, the method including: spreading a set of first cells such that each first cell is divided into two or more chips, wherein the chips are used to form a set of second cells such that each second cell is formed by combining a number of chips derived from the set of first cells, such that the chips derived from each of the first cells are distributed to at least two different second cells; mapping each cell of the set of second cells to a carrier of a symbol; and frequency interleaving the carriers of each symbol, wherein the mapping and the frequency interleaving are performed such that, following the frequency interleaving, the cells of the set of second cells are each mapped to carriers having the same carrier frequency or to carriers having carrier frequencies differing by no more than a threshold.

In accordance with an aspect of another exemplary embodiment, there is provided a method for de-mapping cells from symbols, wherein the symbols includes N symbols in a time-sequence, wherein each symbol includes M carriers in a frequency-order, and wherein each carrier includes a second cell that has been formed by combining a number of chips derived from a set of first cells, the method including: frequency de-interleaving the carriers of each symbol; de-mapping a set of second cells from respective carriers; and de-spreading the chips of the set of second cells to obtain a set of first cells, wherein each cell of the set of first cells is obtained from chips of at least two different second cells.

In accordance with an aspect of another exemplary embodiment, there is provided a method for mapping cells onto symbols, wherein the symbols include N symbols in a time-sequence, each symbol includes M carriers in a frequency-order, and the cells include a sequence of cells, the method including: interleaving the sequence of cells to obtain an interleaved sequence of cells; and mapping a first set of M sequential cells of the interleaved sequence of cells to M respective carriers of a first symbol; and repeating the mapping based on successive sets of M sequential cells and successive symbols.

In accordance with an aspect of another exemplary embodiment, there is provided a method for de-mapping cells from symbols, wherein the symbols include N symbols in a time-sequence, and each symbol includes M carriers in a frequency-order, the method including: de-mapping a first set of M cells from M respective carriers of a first symbol; repeating the de-mapping based on successive sets of M cells and successive symbols, to obtain an interleaved sequence of cells from the de-mapped cells; and de-interleaving the interleaved sequence of cells to obtain a de-interleaved sequence of cells.

In accordance with various aspects of exemplary embodiments, there is provided an apparatus configured to implement the above methods.

In accordance with an aspect of an exemplary embodiment, there is provided an apparatus for mapping cells onto symbols, wherein the cells include two or more cells processed by pre-coding in groups, the symbols include N symbols in a time-sequence, and each symbol includes M carriers in a frequency-order, the apparatus including: a mapper for mapping each cell to a carrier of a symbol; and a frequency interleaver for frequency interleaving the carriers of each symbol, wherein the mapper and the frequency interleaver are configured for performing the mapping and the frequency interleaving such that, following the frequency interleaving, the cells of a group of pre-coded cells are each mapped to carriers having the same carrier frequency or to carriers having carrier frequencies differing by no more than a threshold.

In accordance with an aspect of another exemplary embodiment, there is provided an apparatus for de-mapping cells from symbols, wherein the cells include two or more cells processed by pre-coding in groups, the symbols include N symbols in a time-sequence, and each symbol includes M carriers in a frequency-order, the apparatus including: a frequency de-interleaver for frequency de-interleaving the carriers of each symbol; and a de-mapper for de-mapping cells from carriers of each symbol, wherein, prior to the frequency de-interleaving, the cells of a group of pre-coded cells are each mapped to carriers having the same carrier frequency or to carriers having carrier frequencies differing by no more than a threshold.

In accordance with an aspect of another exemplary embodiment, there is provided an apparatus for mapping cells onto symbols, wherein the symbols include N symbols in a time-sequence, and each symbol includes M carriers in a frequency-order, the apparatus including: a spreader for spreading a set of first cells such that each first cell is divided into two or more chips, wherein the chips are used to form a set of second cells such that each second cell is formed by combining a number of chips derived from the set of first cells, such that the chips derived from each of the first cells are distributed to at least two different second cells; a mapper for mapping each cell of the set of second cells to a carrier of a symbol; and a frequency interleaver for frequency interleaving the carriers of each symbol, wherein the mapper and the frequency interleaver are configured to perform the mapping and the frequency interleaving such that, following the frequency interleaving, the cells of the set of second cells are each mapped to carriers having the same carrier frequency or to carriers having carrier frequencies differing by no more than a threshold.

In accordance with an aspect of another exemplary embodiment, there is provided an apparatus for de-mapping cells from symbols, wherein the symbols include N symbols in a time-sequence, wherein each symbol includes M carriers in a frequency-order, and each carrier includes a second cell that has been formed by combining a number of chips derived from a set of first cells, the apparatus including: a frequency de-interleaver for frequency de-interleaving the carriers of each symbol; a de-mapper for de-mapping a set of second cells from respective carriers; and a de-spreader for de-spreading the chips of the set of second cells to obtain a set of first cells, wherein each cell of the set of first cells is obtained from chips of at least two different second cells.

In accordance with an aspect of another exemplary embodiment, there is provided an apparatus for mapping cells onto symbols, wherein the symbols include N symbols in a time-sequence, each symbol includes M carriers in a frequency-order, and the cells include a sequence of cells, the apparatus including: an interleaver for interleaving the sequence of cells to obtain an interleaved sequence of cells; and a mapper for mapping a first set of M sequential cells of the interleaved sequence of cells to M respective carriers of a first symbol, and for repeating the mapping based on successive sets of M sequential cells and successive symbols.

In accordance with an aspect of another exemplary embodiment, there is provided an apparatus for de-mapping cells from symbols, wherein the symbols include N symbols in a time-sequence, and each symbol includes M carriers in a frequency-order, the apparatus including: a de-mapper for de-mapping a first set of M cells from M respective carriers of a first symbol, and for repeating the de-mapping based on successive sets of M cells and successive symbols, to obtain an interleaved sequence of cells from the de-mapped cells; and a de-interleaver for de-interleaving the interleaved sequence of cells to obtain a de-interleaved sequence of cells.

In accordance with an aspect of another exemplary embodiment, there is provided a system including one or more of the above apparatuses.

Another aspect of the inventive concept provides a computer program including instructions arranged, when executed, to implement a method, system and/or apparatus described above. A further aspect provides machine-readable storage storing such a computer program.

Other aspects, advantages, and salient features of the inventive concept will become apparent to those skilled in the art from the following detailed description, which, taken in conjunction with the annexed drawings, disclose exemplary embodiments of the inventive concept.

BRIEF DESCRIPTION OF THE DRAWINGS

The above and other aspects, and features and advantages of certain exemplary embodiments and aspects of the present invention will be more apparent from the following detailed description when taken in conjunction with the accompanying drawings, in which:

FIG. 9 illustrates a scheme in which a set of cells are spread to generate a set of spread cells, according to an exemplary embodiment;

DETAILED DESCRIPTION OF EXEMPLARY EMBODIMENTS

Figure 1:
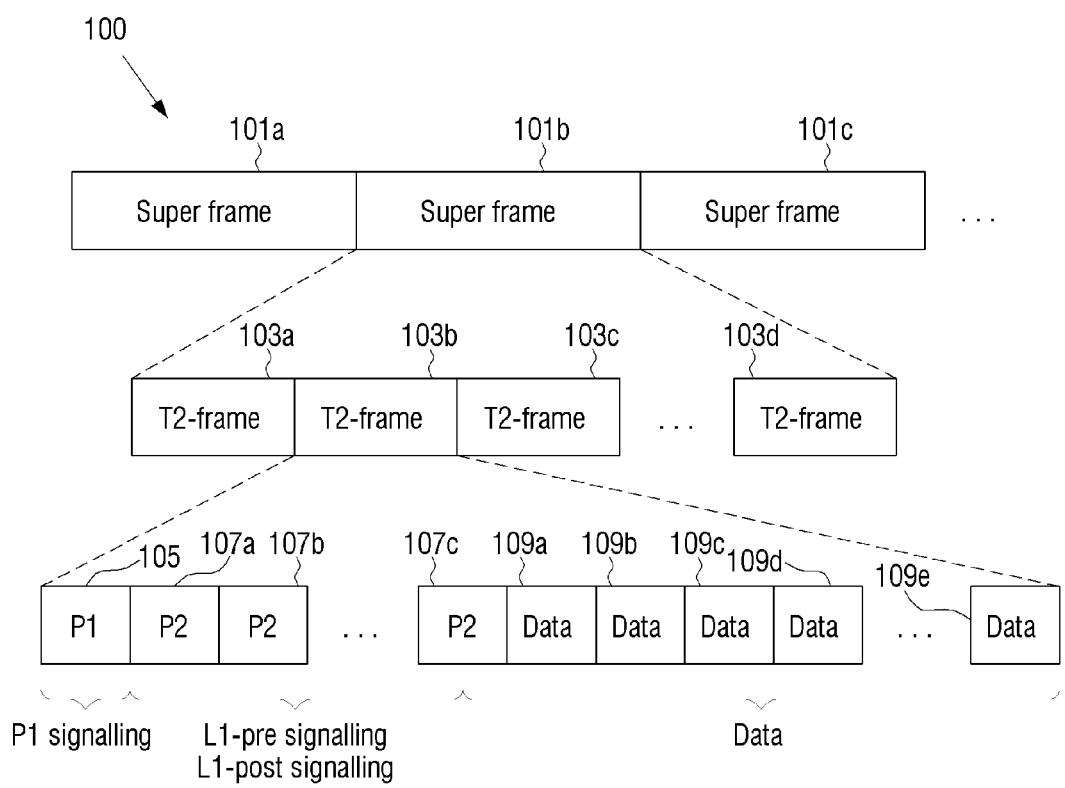
FIG. 1 illustrates a frame structure used in DVB-T2, according to an exemplary embodiment.

The following description of exemplary embodiments of the inventive concept, with reference to the accompanying drawings, is provided to assist in a comprehensive understanding of the inventive concept, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the inventive concept.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the inventive concept.

The terms and words used herein are not limited to the bibliographical or standard meanings, but, are merely used by the inventor to enable a clear and consistent understanding of the inventive concept.

Throughout the description and claims of this specification, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim of the inventive concept are to be understood to be applicable to any other aspect, embodiment, example or claim described herein unless incompatible therewith.

The methods described herein may be implemented in any suitably arranged apparatus or system comprising means for carrying out the method steps.

In DVB-T2, data may be transmitted in a frame structure as shown in FIG. 1, according to an exemplary embodiment. At the top level, the frame structure 100 includes super-frames 101a to 1c, each of which is divided into a number of T2-frames 103a to 103d. Each of the T2-frame 103a to 103d is sub-divided into OFDM symbols, including a number of preamble symbols 105 and 107a to 107c followed by a number of data symbols 109a to 109e.

In each of the T2-frames 103a to 103d, the preamble symbols 105 and 107a to 107c comprise a single P1 preamble symbol 105, followed by one or more P2 preamble symbols 107a to 107c. The P1 symbol 105, located at the beginning of a T2 frame includes information on the format and type of the preamble symbols 105 and 107a to 107c, and is also used to carry S1/S2 signalling which provides information on the Fast Fourier Transform (FFT) size and guard interval of the OFDM symbols in the T2-frame.

The P2 symbols 107a to 107c, immediately following the P1 symbol 105, provides L1 signalling information, and may also carry data. The number of P2 symbols 107a to 107c per T2-frame, denoted by $N_{P2}$, is variable and depends on the FFT-size. For example, $N_{P2}$ is equal to 16, 8, 4, 2, 1 and 1 for FFT-sizes of 1 k, 2 k, 4 k, 8 k, 16 k and 32 k, respectively. The L1 signalling is divided into L1-pre signalling and L1-post signaling. The L1 -pre signalling includes basic information about the T2 frame structure 100 (e.g. the number of T2-frames 103a to 103d in a super-frame 101a, 101b or 101c and the number of data symbols 109a to 109e in a T2-frame 103a, 103b, 103c or 103d), and enables the reception and decoding of the L1-post signaling. The L1-post signalling provides sufficient information for the receiver to decode Physical Layer Pipes (PLPs) within the T2-frames 103a to 103d, which carry data.

Service data (e.g. in the form of one or more MPEG-2 Transport Streams) may be separated into one or more data streams, which are then carried in the form of PLPs. Each PLP is a logical channel, which may carry one or multiple services.

In the following, a modulation value for one OFDM carrier during one OFDM symbol (e.g. a single constellation point) may be referred to as an OFDM cell. An OFDM cell corresponding to data (e.g. PLP data) may be referred to as a data cell and an OFDM cell corresponding to signalling may be referred to as a signalling cell. An OFDM cell corresponding to L1 signalling (including L1-pre and L1-post) may be referred to as an L1 signalling cell.

The procedure by which information is mapped to symbols of a T2-frame 103a, 103b, 103c or 103d will now be briefly described.

The carriers of the OFDM symbols forming a T2-frame 103a, 103b, 103c or 103d may be pictured as forming a grid of cells. Cells of the grid corresponding to different carriers of the same OFDM symbol may be arranged in the same column (e.g. with cells corresponding to carriers of increasing frequency being arranged from top to bottom), while cells of the grid corresponding to carriers having the same carrier frequency of different OFDM symbols may be arranged in rows (e.g. with cells corresponding to OFDM symbols in order of time being arranged from left to right). A particular cell within the grid may be specified by a pair of indices, including a first index I indexing an OFDM symbol within a T2-frame 103a, 103b, 103c or 103d, and a second index p, indexing a carrier within a symbol. A cell corresponding to the pth carrier of the lth symbol may be denoted $x_{l,p}$. The indices p and l may be numbered starting from zero.

For example, the P2 symbols 107a to 107c in a T2-frame 103a, 103b, 103c or 103d may be pictured as a $C_{P2} \times N_{P2}$ grid of cells, having $C_{P2}$ rows and $N_{P2}$ columns, where $C_{P2}$ denotes the number of active carriers (carriers not used for pilots or tone reservation) per P2 symbol and $N_{P2}$ denotes the number of P2 symbols 107a to 107c per T2-frame. The values of $C_{P2}$ and $N_{P2}$ are dependent on the FFT-size.

Information (including signalling and data) is mapped to symbols of the T2-frame 103a, 103b, 103c or 103d. This process may be pictured as mapping OFDM cells, including signalling cells and data cells, to cells of a grid of the form described above.

L1 signalling cells are mapped to cells of the P2 symbols 107a to 107c in a row-wise zig-zag manner, such that L1 signalling cells are mapped to fill a row of the aforementioned grid before proceeding to the next row. After L1 signalling cells have been mapped to cells of the P2 symbols 107a to 107c, the remaining active cells of the P2 symbols 107a to 107c and the following data symbols 109a to 109e are available for carrying PLP data in a non zig-zag manner.

Once information has been mapped to symbols of the T2-frame 103a to 103d, frequency interleaving is performed on a symbol-by-symbol basis such that the cells of each individual OFDM symbol are permuted according to a certain permutation function or pattern. In the grid picture described above, the frequency interleaving may be regarded as permuting the cells within each column of the grid.

A first permutation function is used for even symbols of the T2-frame 103a, 103b, 103c or 103d (i.e. symbols having an index I such that l mod 2=0) and a second permutation function is used for odd symbols of the T2-frame 103a, 103b, 103c or 103d (i.e. symbols having an index I such that l mod 2=1). The permutation functions differ depending on the FFT size.

Following the frequency interleaving stage, an optional stage may be performed prior to transmission for applying Multiple-Input-Single-Output (MISO) processing or pre-coding to the mapped information. MISO processing, which is applied at the cell level, allows the T2 signal to be split between two transmitters.

MISO processing is performed on cell pairs, each pair of cells comprising adjacent cells within the same OFDM symbol that has already undergone frequency interleaving (i.e. following frequency interleaving, the cells forming a pair have the same symbol index I and cell indices p differing by 1). Each pair of cells is encoded to generate a pair of encoded cells. Then, the pairs of original cells are transmitted by a first transmitter, while corresponding pairs of encoded cells are transmitted by a second transmitter.

DVB-NGH is similar to DVB-T2 in many respects. However, a number of differences between DVB-T2 and DVB-NGH include the following. First, in DVB-NGH, zig-zag mapping is not used for mapping L1 signalling cells to P2 symbols, for example because $N_{P2}=1$ for all FFT-sizes, except 1 k and 2 k. Second, frequency interleaving is modified so that, rather than applying independent permutation functions to even and odd symbols, a shift is applied to even and odd interleavers in order to achieve a different permutation for each symbol. Third, MISO processing is extended to Multiple-Input-Multiple-Output (MIMO) processing, including spatial multiplexing schemes. MIMO processing is not applied after frequency interleaving, but rather, corresponding processing is applied at the PLP level before cell mapping and frequency interleaving. This allows for a mixture of Single-Input-Single-Output (SISO), Multiple-Input-Multiple-Output (MIMO), and MISO in PLPs.

Since DVB-NGH does not apply zig-zag mapping for mapping L1 signalling cells to P2 symbols, the potential benefits from using zig-zag mapping, including time diversity and resilience to impulsive noise, may be lost. One problem with applying zig-zag mapping in systems in which frequency interleaving is performed after MIMO processing, for example DVB-NGH, is that pairs of cells on which MIMO processing is applied become separated in the frequency domain as a result of frequency interleaving, which is not desirable. Therefore, what is desired is methods, systems and apparatus for mapping cells to symbols using zig-zag mapping or zig-zag type mapping, or an alternative technique that retains some or all of the benefits of zig-zag mapping, and which may be applied to a variety of broadcasting systems, including DVB-NGH.

Exemplary embodiments described below may apply various techniques for mapping cells to symbols (and corresponding techniques for de-mapping cells from symbols). These embodiments are described in relation to a DVB system, for example DVB-NGH. However the skilled person will appreciate that the inventive concept is applicable to other kinds of system. These embodiments are also described in relation to mapping L1 signalling cells to P2 OFDM symbols. However, the skilled person will appreciate that the inventive concept may be used to map other kinds of cell to other kinds of symbol. For example, in certain exemplary embodiments, data cells may be mapped to preamble or data symbols.

Figure 2A:
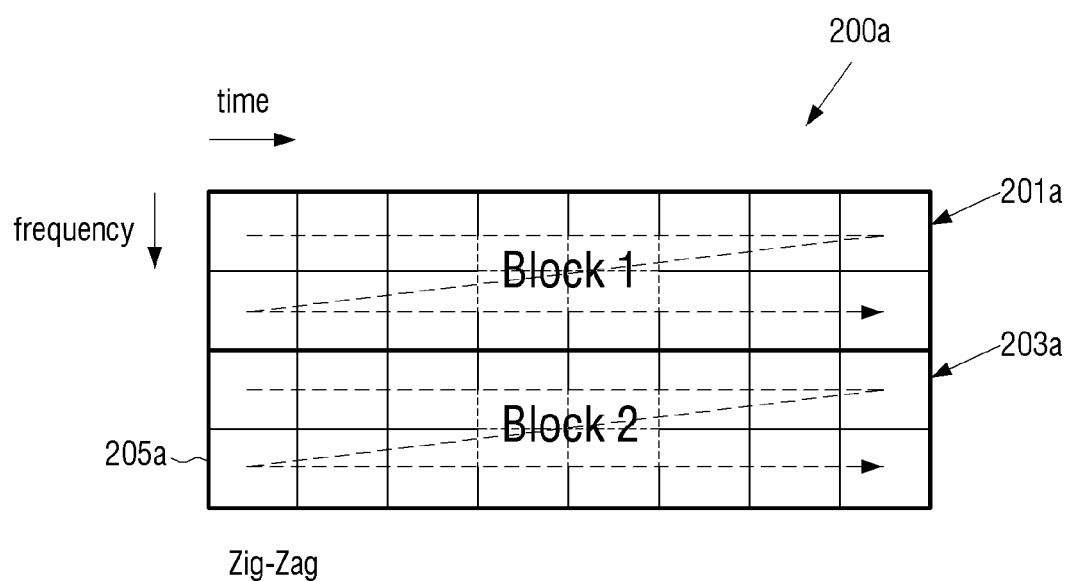
FIGS. 2a and 2b illustrate how zig-zag mapping may achieve greater time diversity, according to an exemplary embodiment.
Figure 2B:
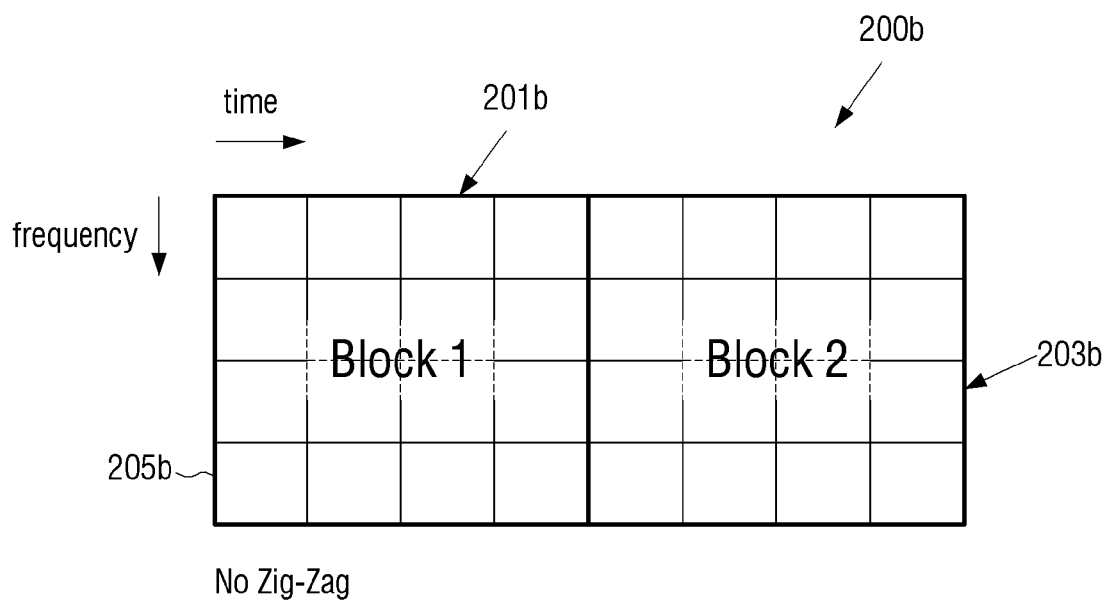

As mentioned above, potential benefits from using zig-zag mapping include time diversity and resilience to impulsive noise. FIGS. 2A and 2B illustrate how zig-zag mapping may achieve greater time diversity. As shown, two blocks of data 201a, 201b, 203a and 203b, each block comprising 16 cells 205a and 205b, are mapped to a set of eight symbols, each symbol comprising four carriers. The cells 205a and 205b of the first data block 201 a and 201b are mapped sequentially to the cells of the grid 200a and 200b, and then the cells 205a and 205b of the second data block 203a and 203b are mapped sequentially to the remaining cells of the grid 200a and 200b, respectively. FIG. 2A illustrates a case in which row-wise zig-zag mapping is used, and FIG. 2B illustrates a case in which row-wise zig-zag mapping is not used. It can be seen that, when row-wise zig-zag mapping is used, each data block 201a, 203a occupies eight symbols, whereas when row-wise zig-zag mapping is not used, each data block 201b, 203b occupies four symbols (i.e. fewer symbols). Thus, greater time diversity may be achieved when using row-wise zig-zag mapping.

Figure 3A:
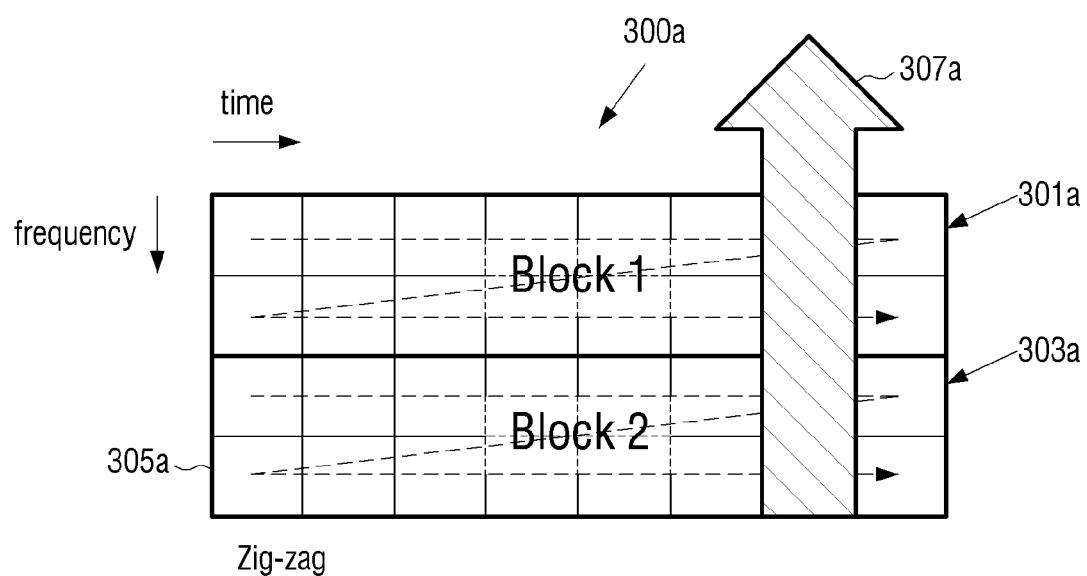
FIGS. 3a and 3b illustrate how zig-zag mapping may achieve greater resilience to impulsive noise, according to an exemplary embodiment.
Figure 3B:
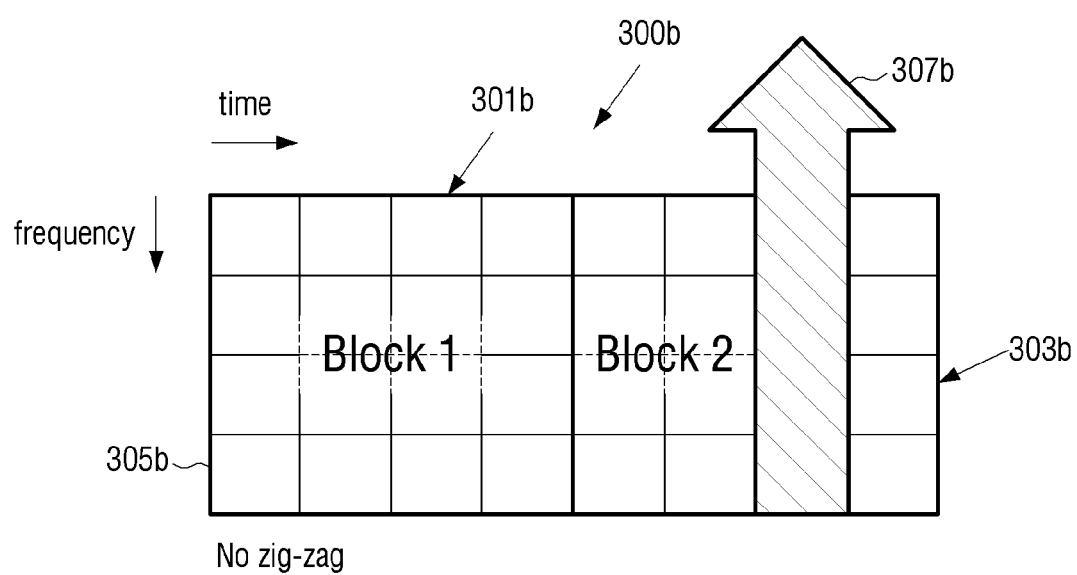

FIGS. 3A and 3B illustrate how zig-zag mapping may achieve greater resilience to impulsive noise (i.e. a source of noise having a relatively short duration and a relatively high magnitude). As shown, in a similar manner as illustrated in FIGS. 2A and 2B, two blocks of data 301a-b, 303a-b, each block comprising 16 cells 305a-b, are mapped to a set of eight symbols, each symbol comprising four carriers, using row-wise zig-zag mapping (FIG. 3A) and without using row-wise zig-zag mapping (FIG. 3B). An occurrence of impulsive noise, indicated in each of FIGS. 3A and 3B as a vertical arrow 307a-b, results in corruption of one of the symbols. It can be seen that, when row-wise zig-zag mapping is used, two cells 305a of each data block 301a, 303a, or ⅛ of the cells 305a, are corrupted, whereas when row-wise zig-zag mapping is not used, four cells 305b of the second data block 303b, or ¼ of the cells 305b, (i.e. a greater proportion of the cells 305b of the second data block 303b) are corrupted. Thus, greater resilience to impulsive noise may be achieved when using row-wise zig-zag mapping.

In view of the aforementioned advantages, the exemplary embodiments of the inventive concept apply zig-zag mapping or zig-zag type mapping for mapping cells to symbols. However, as mentioned above, some systems, for example DVB-NGH, first apply pre-coding (e.g. MIMO pre-coding) to groups of cells (e.g. pairs of cells), and then perform mapping and frequency interleaving after pre-coding. This can result in a problem when using zig-zag mapping. In particular, when using zig-zag mapping, in which mapping is applied in a row-wise manner, the cells of a pre-coded pair of cells are initially mapped to carriers having the same carrier frequency in adjacent symbols. However, as a result of the different permutation patterns applied to different symbols in the subsequent step of frequency interleaving, the cells of a pre-coded pair of cells will generally become separated in the frequency domain as a result of the frequency interleaving. On the other hand, it is generally preferable, but not necessary, that pre-coded pairs of cells are transmitted through the same or similar channels (i.e. channels having the same or similar frequency).

Thus, in certain exemplary embodiments, modifications may be made to the mapping scheme and/or the frequency interleaving scheme such that certain benefits of zig-zag mapping may be retained while allowing cell mapping and frequency interleaving to be performed after pre-coding.

In the exemplary embodiments described below, a set of K cells, $f_i$, i=0, 1, 2, . . . , K−1, are mapped to the carriers of a set of N symbols, and then the symbols are subjected to frequency interleaving. In the embodiments described below, each symbol comprises M carriers, although, in other embodiments, different symbols may comprise different numbers of carriers. Some or all of the cells $f_i$ may be pre-coded in groups. The pre-coding may comprise, for example, pre-coding for Single-Input-Single-Output (SISO), Multiple-Input-Single-Output (MISO), Multiple-Input-Multiple-Output (MIMO), and/or any other suitable type of pre-coding. MISO and MIMO may be referred to collectively as MIXO. The cells $f_i$ may be pre-coded, for example, in pairs, and/or other suitable grouping. The cells $f_i$ may all be pre-coded according to the same pre-coding scheme or according to two or more different pre-coding schemes The cells $f_i$ may carry signalling, data, or any other suitable type of information. A cell $f_i$ may carry information modulated using any suitable modulation scheme, for example QAM (e.g. 16-QAM, 64-QAM or 256-QAM), PSK (e.g. BPSK, 4-PSK or 8-PSK) or ASK. The symbols may be OFDM symbols, or any other suitable multi-carrier symbol. In the embodiments described below, the cells $f_i$ are L1 signalling cells and the symbols are P2 symbols in a DVB frame. In this example, N is equal to the DVB parameter $N_{P2}$, and M is equal to the DVB parameter $C_{P2}$.

It will be appreciated that the inventive concept is not limited to the specific examples described above.

In the following, for convenience of description, the mapping and frequency interleaving schemes will be described with reference to the grid picture mentioned above. To reiterate, the carriers of the symbols may be pictured as forming a grid of cells. Cells of the grid corresponding to different carriers of the same symbol may be arranged in the same column (e.g. with cells corresponding to carriers of increasing frequency being arranged from top to bottom), while cells of the grid corresponding to carriers having the same carrier frequency of different symbols may be arranged in rows (e.g. with cells corresponding to symbols in order of time being arranged from left to right). In the embodiments described below, the grid comprises N columns and M rows. A cell located in the pth row (p=0, 1, 2, . . . , M−1) and lth column (l=0, 1, 2, . . . , N−1) of the grid corresponds to the pth carrier of the lth symbol, and may be denoted $x_{l,p}$.

Thus, in the embodiments of the inventive concept, at a transmitter side of a broadcast system, a mapping scheme may be applied to map cells $f_i$, corresponding to the information to be mapped, to cells $x_{l,p}$ of the grid. A frequency interleaving scheme may then be applied to permute the cells within each column of the grid. A cell located in the pth row (p=0, 1, 2, . . . , M−1) and lth column (l=0, 1, 2, . . . , N−1) of the grid after interleaving may be denoted $a_{l,p}$.

Following mapping and frequency interleaving, the resulting frame is transmitted from the transmitter side of the broadcast system, and the transmitted frame is subsequently received by a receiver side of the broadcast system. At the receiver side, a frequency de-interleaving scheme is applied to the received frame, wherein the frequency de-interleaving scheme corresponds to the frequency interleaving scheme applied at the transmitter side (i.e. the frequency de-interleaving is designed to reverse the effect of the frequency interleaving carried out at the transmitter side). Then, a de-mapping scheme is applied to the frequency de-interleaved frame to recover the original cells $f_i$, wherein the de-mapping scheme corresponds to the mapping scheme applied at the transmitter side (i.e. the de-mapping is designed to reverse the effect of the mapping carried out at the transmitter side).

Figure 4:
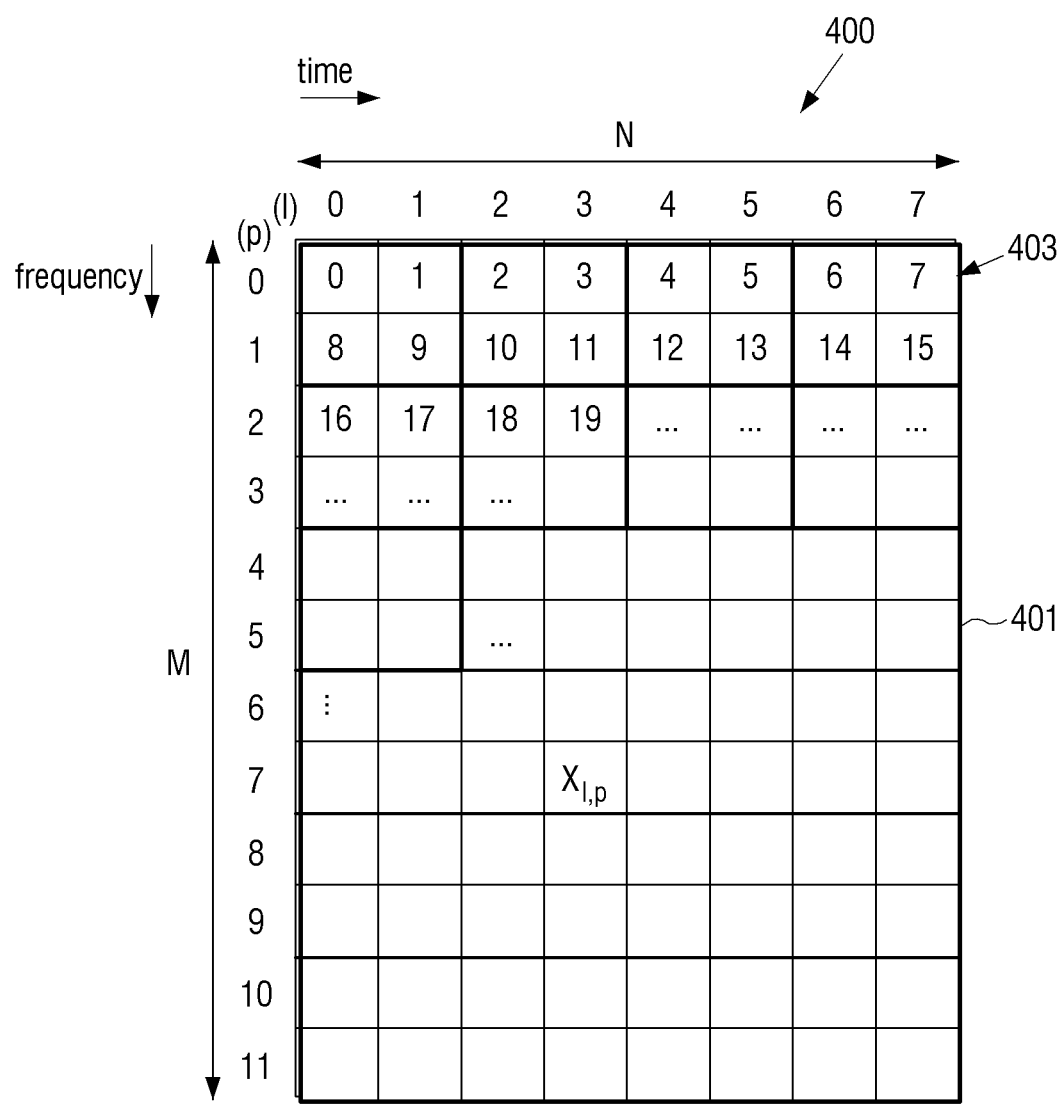
FIG. 4 illustrates a mapping and interleaving scheme, and a corresponding de-mapping and de-interleaving scheme, according to an exemplary embodiment.
Figure 11:
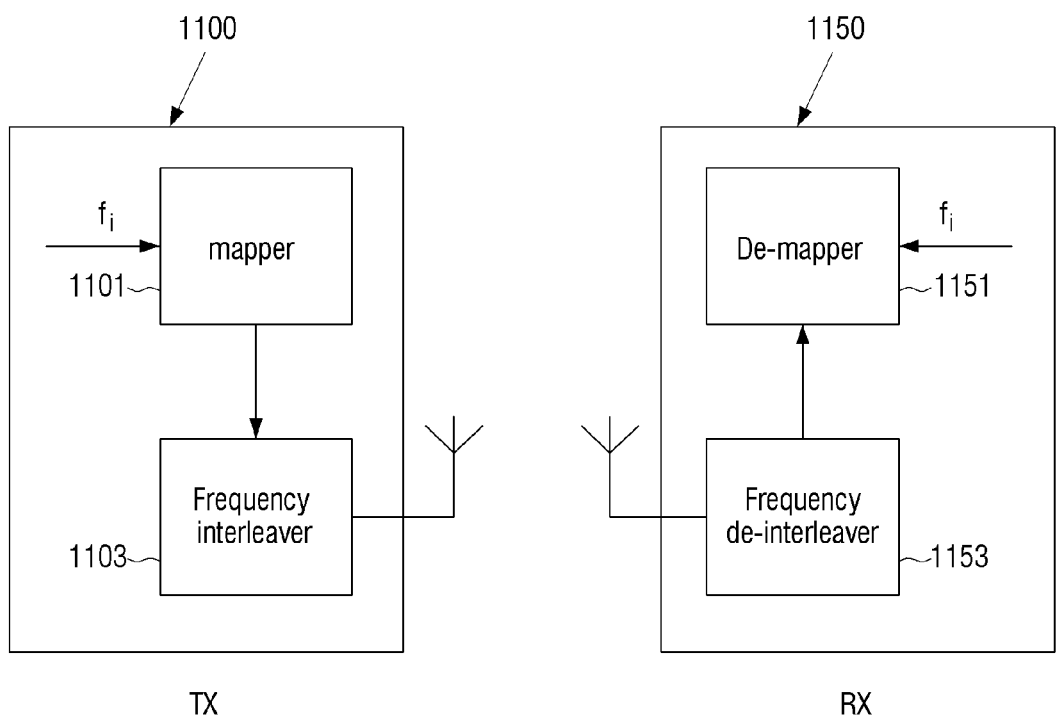
FIG. 11 illustrates an apparatus for implementing the schemes illustrated in FIGS. 4-7, according to an exemplary embodiment.
Figure 12A:
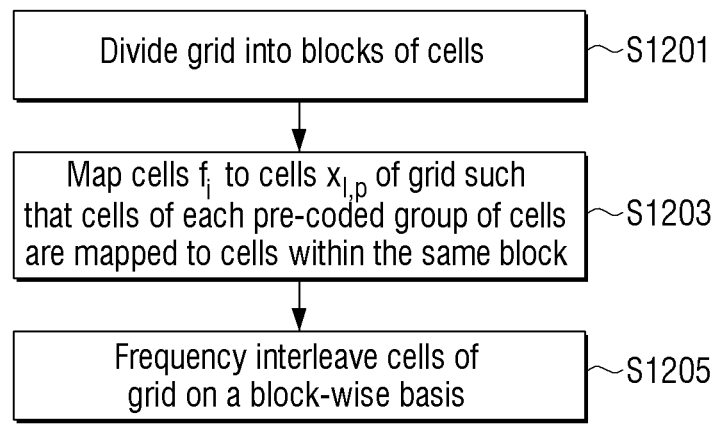
FIGS. 12a-12c illustrate methods for implementing the schemes illustrated in FIGS. 4-7, according to exemplary embodiments.

FIG. 4 illustrates a mapping and frequency interleaving scheme, and a corresponding de-mapping and frequency de-interleaving scheme, according to an exemplary embodiment. FIGS. 11 and 12a illustrate a system (e.g. a DVB system comprising a DVB transmitter apparatus and/or a DVB receiver apparatus) and method for implementing the scheme illustrated in FIG. 4, according to exemplary embodiments. The skilled person will appreciate that FIG. 11 schematically illustrates only those components relating specifically to the scheme illustrated in FIG. 4, and that the apparatus illustrated in FIG. 11 may comprise one or more additional components in various embodiments.

In this scheme, in a first step 1201, a grid 400 is divided into blocks 403 of cells 401 (e.g. a contiguous or non-contiguous block 403 of cells 401 comprising v rows and w columns). In a next step 1203, the cells $f_i$ are mapped to cells $x_{l,p}$ 401 of the grid 400 such that the cells of each pre-coded group of cells are mapped to cells 401 within the same block 403. The mapping 1203 is performed by a mapper 1101 of a transmitter side apparatus 1100. In a next step 1205, the cells 401 of the grid 403 are then frequency interleaved on a block-wise basis. For example, frequency interleaving is performed such that the vertical arrangement of the blocks 403 within the grid 400 is modified. The relative positions of cells 401 within each block 403 may remain the same following frequency interleaving. Alternatively, the cells 401 within one or more blocks 403 may be permuted, with such permutation occurring within each block 403. The frequency interleaving 1205 is performed by a frequency interleaver 1103 of the transmitter side apparatus 1100.

When performing frequency interleaving in step 1205, the permutation patterns applied to the vertical arrangements of blocks 403 are not limited to any particular example. In some exemplary embodiments, a different permutation pattern may be applied to each vertical arrangement of blocks 403. In other exemplary embodiments, two or more different permutation patterns may be applied to two or more respective sets of vertical arrangements of blocks 403. For example, a first permutation pattern may be applied to odd-numbered vertical arrangements of blocks 403, while a second permutation pattern may be applied to even-numbered vertical arrangements of blocks 403.

In the above-described scheme, by mapping the cells of each pre-coded group of cells to blocks 403 in step 1203, and by performing frequency interleaving on a block-wise basis in step 1205, pre-coded groups of cells will remain close together in the frequency domain, even following frequency interleaving in step 1205. That is, the difference in frequency between any two cells of a given pre-coded group of cells will be no larger than a certain threshold (possibly zero). The size of the blocks 403, for example the value of v, may be selected to satisfy any suitable channel requirements for groups of pre-coded cells.

In the example illustrated in FIG. 4, the cells $f_i$, are mapped to cells $x_{l,p}$ 401 in a zig-zag configuration. For example, the ith cell $f_i$, l=0, 1, 2, . . . , K−1 is mapped to cell $x_{l,p}$ 401 in the lth column and pth row of the grid 400 l=0, 1, 2, . . . , N−1; p=0, 1, 2, . . . , M−1, where l=i mod N and p=⌊i/N⌋. In this example, the cells $f_i$, are MIXO pre-coded in pairs such that pairs of cells $f_{2j}$ and $f_{2j+1}$, j=0, 1, 2, . . . , K/2−1, are pre-coded together (e.g. pairs {$f_0$, $f_1$}, {$f_2$, $f_3$}, etc. are pre-coded together). Frequency interleaving 1205 is then performed block-wise on 2×2 blocks 403 (comprising two rows and two columns). Alternatively, block-wise frequency interleaving in step 1205 may be performed on other suitable block sizes, for example 1×2 blocks (comprising one row and two columns) or 4×4 blocks (comprising four rows and two columns). It can be seen that, in this example, the cells of a pair of MIXO pre-coded cells are initially mapped to the same row of the grid 400, in adjacent columns. Following frequency interleaving, the cells of the pair of MIXO pre-coded cells remain on the same row (although on a different row than before).

According to an exemplary embodiment, cells of a first type (e.g. signalling cells) may be mapped to cells of the grid in a row-wise zig-zag manner. According to another exemplary embodiment, cells of a second type (e.g. data cells or PLP data cells) may be mapped to cells of the grid in a column-wise manner. It is preferable, but not necessary, that any cells that have been pre-coded in groups are not separated in the frequency domain after frequency interleaving. Therefore, if cells mapped in a row-wise manner, and cells mapped in a column-wise manner are mapped to cells of the grid, then to avoid separating pre-coded groups of cells in the frequency domain following interleaving, regardless of the mapping direction, then the cells of the grid may be frequency interleaved block-wise based on blocks comprising more than one row and more than one column (e.g. 2×2 blocks).

According to an exemplary embodiment, it is preferable that the mapping is performed such that cells of a pre-coded group of cells are not split across multiple rows of the grid.

As illustrated in FIG. 11, at the receiver side, frequency de-interleaving (e.g. block-wise frequency de-interleaving) is performed by a frequency de-interleaver 1153 of a receiver side apparatus 1150, and de-mapping (e.g. row-wise zig-zag de-mapping) is performed by a de-mapper 1151 of the receiver side apparatus 1150 to recover the original cells $f_i$.

Figure 5:
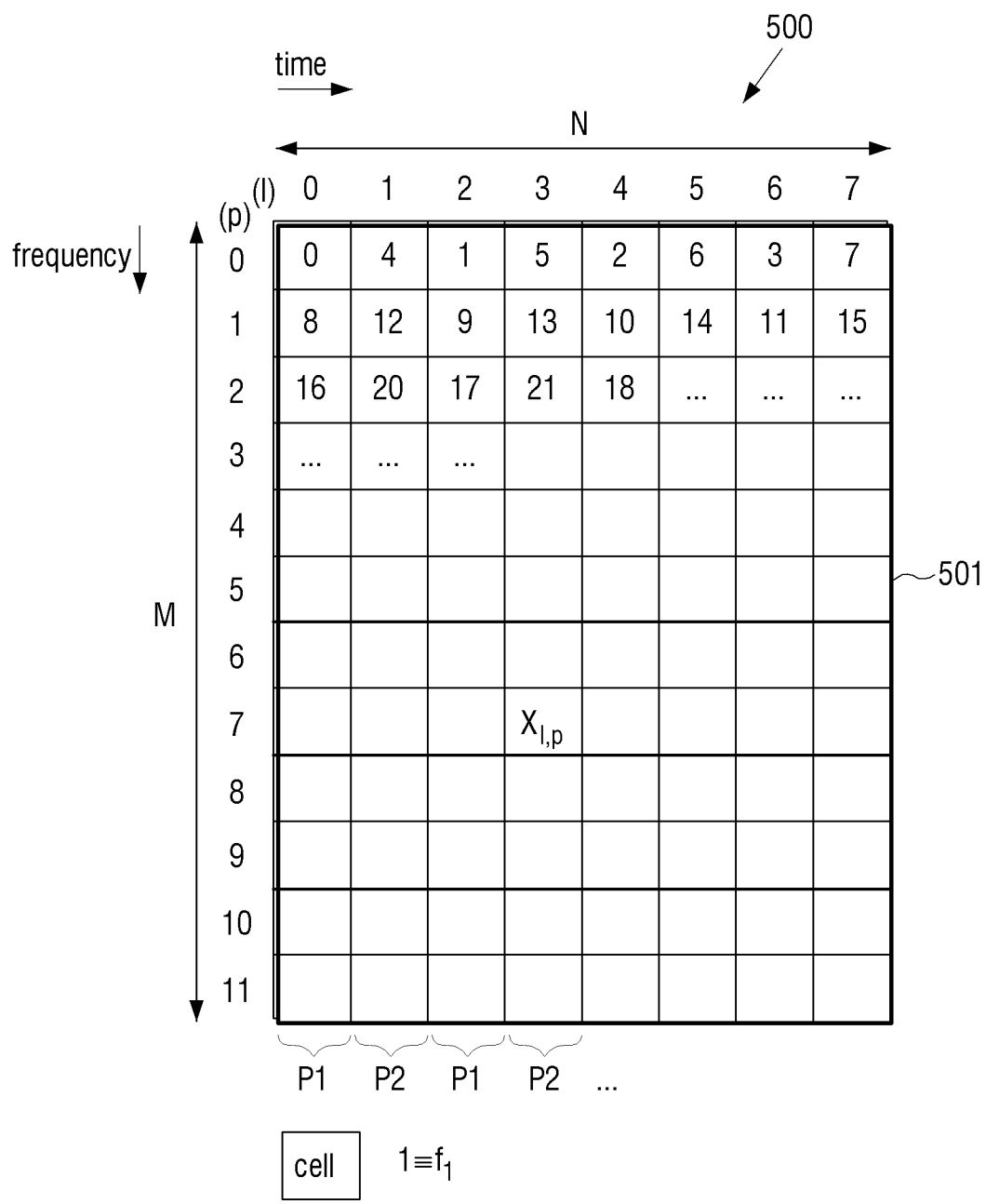
FIG. 5 illustrates a mapping and interleaving scheme, and a corresponding de-mapping and de-interleaving scheme, according to an exemplary embodiment.
Figure 12B:
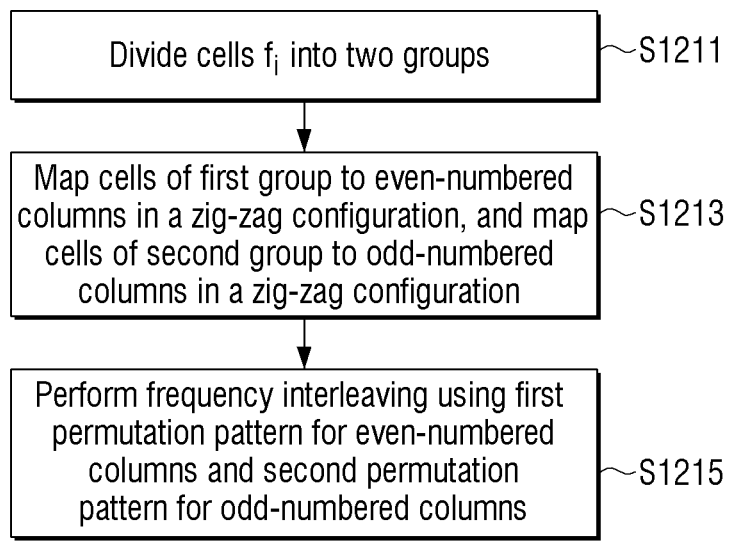

FIG. 5 illustrates a mapping and interleaving scheme, and a corresponding de-mapping and de-interleaving scheme, according to another exemplary embodiment. The scheme illustrated in FIG. 5 may be implemented in a similar apparatus to the one illustrated in FIG. 11. FIG. 12B illustrates a method for implementing the scheme illustrated in FIG. 5, according to an exemplary embodiment. In this scheme, cells of a pre-coded group of cells are mapped to a set of cells 501 of the grid 500: (i) located in the same row, and (ii) located in columns to which the same frequency interleaving permutation pattern is applied. Thus, by applying this scheme, the cells of a pre-coded group of cells will remain located on the same row of the grid 500, even following frequency interleaving.

In the example illustrated in FIG. 5, even-numbered columns of the grid 500 (i.e. columns such that l mod 2=0) are permuted using a first permutation pattern (P1), and odd-numbered columns of the grid 500 (i.e. columns such that l mod 2=1) are permuted using a second permutation pattern (P2). In this example, the cells $f_i$, are MIXO pre-coded in pairs such that pairs of cells $f_{2j}$ and $f_{2j+1}$, j=0, 1, 2, . . . , K/2−1, are pre-coded together.

For performing mapping, in a first step 1211, the cells $f_i$, l=0, 1, 2, . . . , K−1 are first divided into two groups, where the first group comprises cells $f_i$ such that i mod N<N/2 (e.g. $f_0$, $f_1$, $f_2$, $f_3$, $f_8$, $f_9$, $f_{10}$, $f_{11}$, etc.) and the second group comprises cells $f_i$ such that i mod N≥N/2 (e.g. $f_4$, $f_5$, $f_6$, $f_{12}$, $f_{13}$, $f_{14}$, $f_{15}$, etc.). As shown in FIG. 5, in a next step 1213, the cells of the first group are then mapped to even-numbered columns in a zig-zag configuration, and the cells of the second group are mapped to odd-numbered columns in a zig-zag configuration. The mapping in the step 1213 is performed by the mapper 1101 of the transmitter side apparatus 1100. In a next step 1215, frequency interleaving is then performed using a first permutation pattern (P1) for the even-numbered columns and a second permutation pattern (P2) for the odd-numbered columns. The frequency interleaving 1215 is performed by the frequency interleaver 1103 of the transmitter side apparatus 1100.

At the receiver side, frequency de-interleaving (e.g. frequency de-interleaving based on the inverse of permutation patterns P1 and P2 for even-numbered and odd-numbered columns, respectively) is performed by the frequency de-interleaver 1153 of the receiver side apparatus 1150, and de-mapping (e.g. de-mapping cells in two groups from even-numbered and odd-numbered columns) is performed by the de-mapper 1151 of the receiver side apparatus 1150 to recover the original cells $f_i$.

Figure 6:
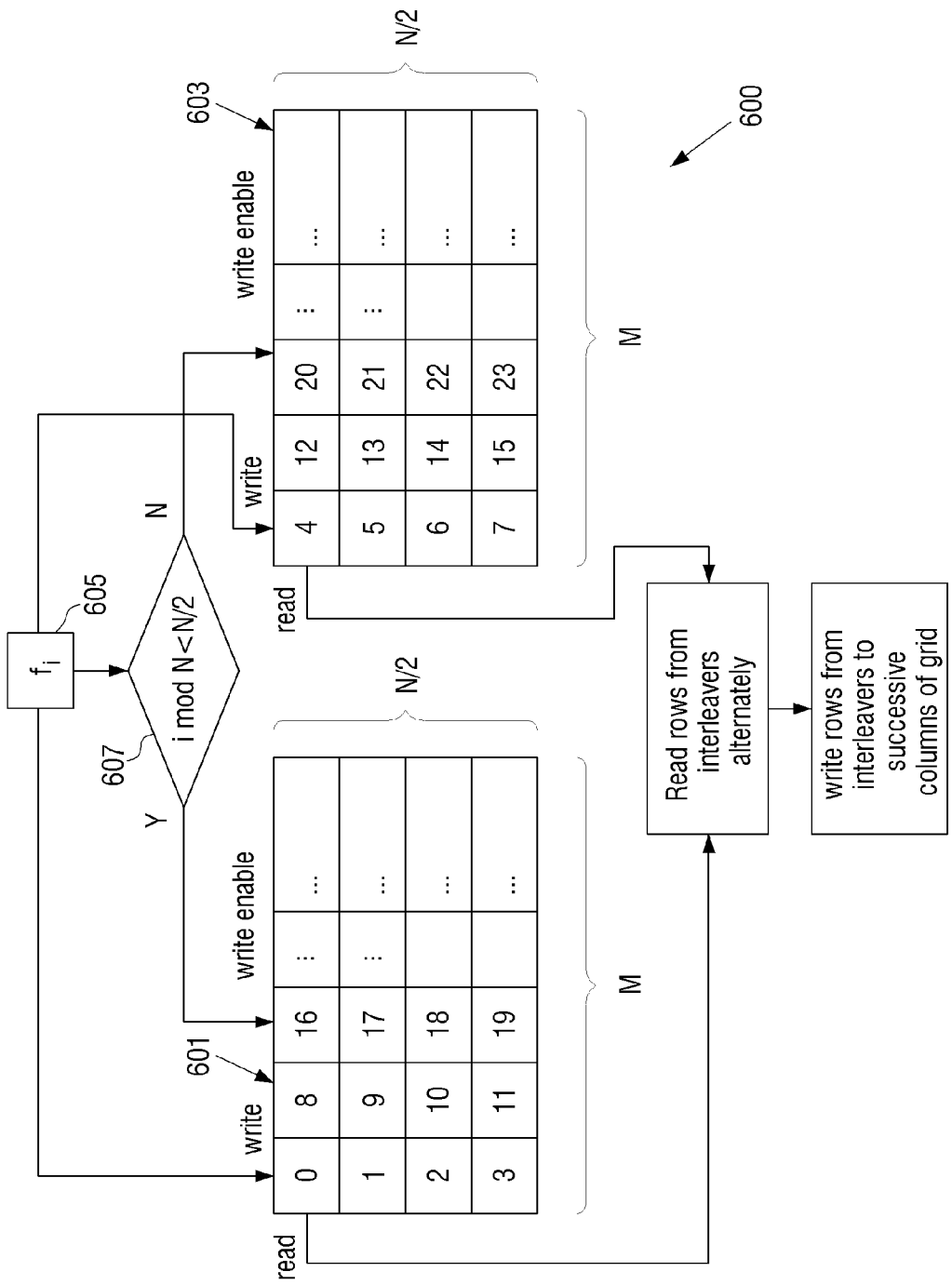
FIG. 6 schematically illustrates a scheme for performing the mapping illustrated in FIG. 5 using two interleavers, according to an exemplary embodiment.

FIG. 6 schematically illustrates an apparatus 600 for performing the exemplary mapping illustrated in FIG. 5 using two interleavers 601, 603 (e.g. zig-zag interleavers). The apparatus 600 comprises a first block interleaver 601 having N/2 rows and M columns, and a second block interleaver 603 having N/2 rows and M columns. Each interleaver 601, 603 is configured such that values may be read into the interleaver 601, 603 column by column, while values may be read out from the interleaver 601, 603 row by row.

To perform mapping, first, the sequence of cells $f_i$ are read in order 605, wherein if i mod N<N/2 607, then the cell $f_i$ is read into the first interleaver 601, whereas if i mod N≥N/2 607, then the cell $f_i$ is read into the second interleaver 603, until all of the cells $f_i$ have been read into the interleavers 601, 603. Next, rows of the first 601 and second 603 interleavers are read out alternately, starting with the first interleaver 601. The rows read out from the first interleaver 601 are mapped to even-numbered columns of the grid 500, while the rows read out from the second interleaver 603 are mapped to the odd-numbered columns of the grid 500.

Although the above specific example has been described with reference to dividing the cells $f_i$ into two groups and mapping the two groups to two respective sets of columns of the grid 500 to which frequency interleaving is applied using two respective permutation patterns (P1 and P2), the skilled person will appreciate the similar principles may be applied based on more than two groups.

Figure 7:
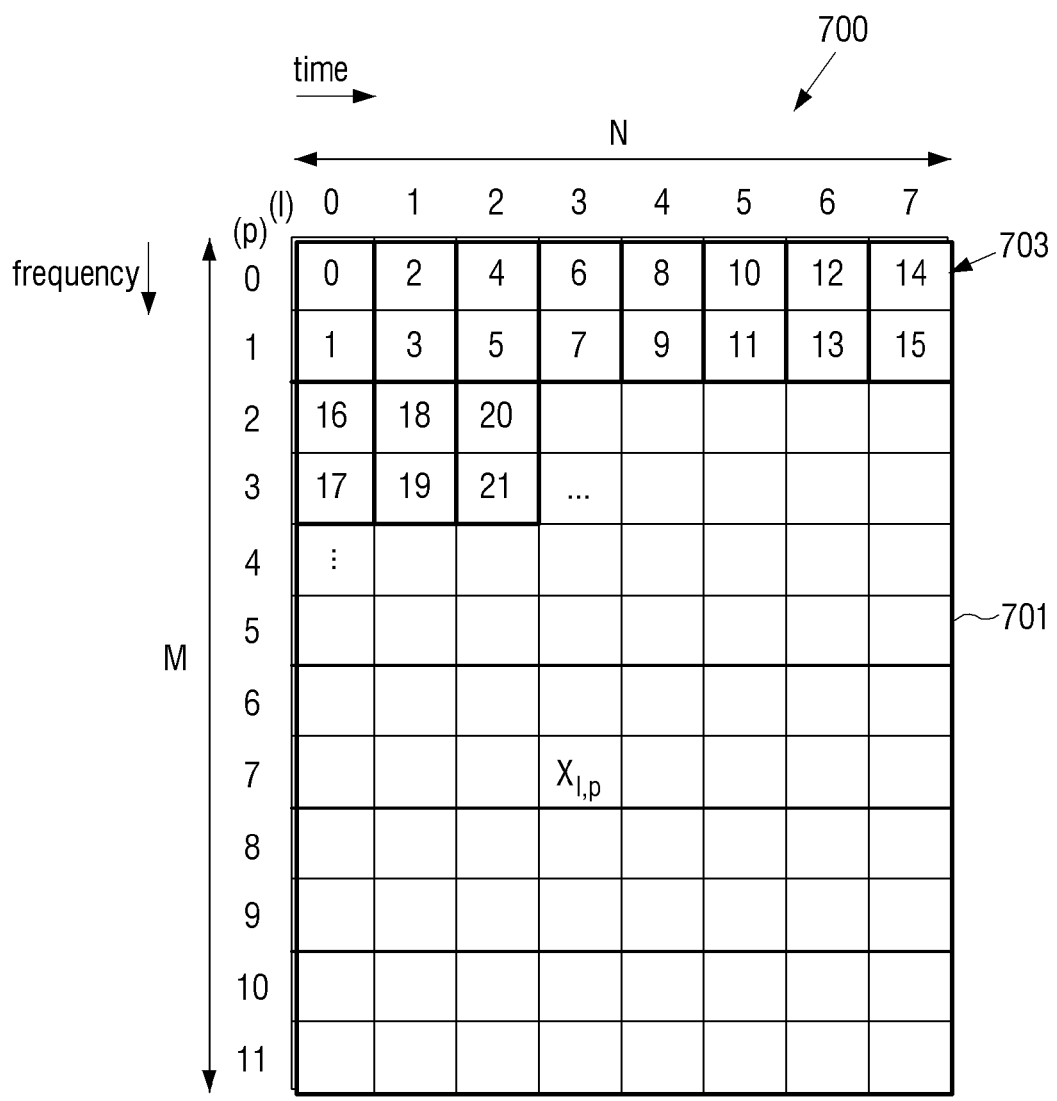
FIG. 7 illustrates a mapping and interleaving scheme, and a corresponding de-mapping and de-interleaving scheme, according to an exemplary embodiment.
Figure 12C:
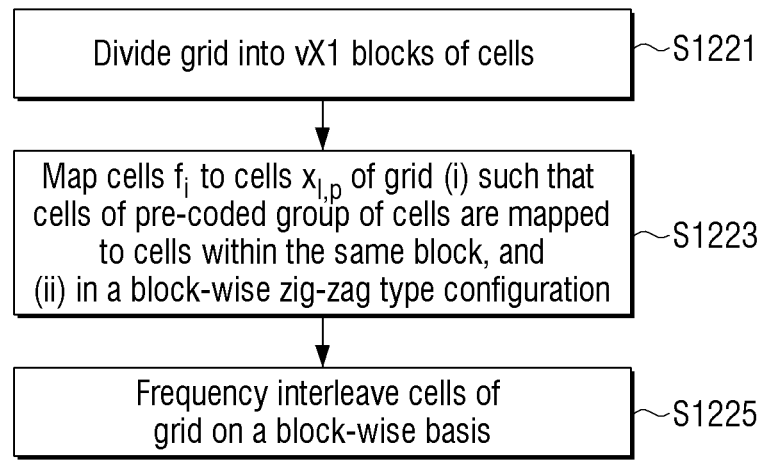

FIG. 7 illustrates a mapping and interleaving scheme, and a corresponding de-mapping and frequency de-interleaving scheme according to an exemplary embodiment. The scheme illustrated in FIG. 7 may be implemented in a similar apparatus to the one illustrated in FIG. 11. FIG. 12c illustrates a method for implementing the scheme illustrated in FIG. 7, according to an exemplary embodiment. In this scheme, in a first step 1221, the grid 700 is divided into blocks 703 of cells 701, each block 703 comprising a contiguous block of cells 701 comprising v rows and one column. In a next step 1223, the cells $f_i$ are mapped to cells $x_{l,p}$ 701 of the grid 700 such that the cells of a pre-coded group of cells are mapped to cells 701 within the same block 703. Furthermore, the cells $f_i$ are mapped in a zig-zag type configuration, in which blocks 703 are used as a unit of mapping (i.e. the mapping is performed block-wise), and blocks 703 are mapped row-wise in a zig-zag configuration. For example, as shown in FIG. 7, the mapping may be applied such that cell $f_k$, k=(vi+j), j=0, 1, 2, ... v-1; l=0, 1, 2, ..., K/v-1 is mapped to cell $x_{li,pi}$ 701 in the $p_i$th row of the $l_i$th column of the grid 700, where $l_i$=i mod N and $p_i$=v⌊i/N⌋+j. The mapping 1223 is performed by the mapper 1101 of the transmitter side apparatus 1100.

In a next step 1225, the cells 701 of the grid 700 are then frequency interleaved on a block-wise basis in a similar manner to the scheme illustrated in FIG. 4. As with the scheme illustrated in FIG. 4, when performing frequency interleaving, the permutation patterns applied to the vertical arrangements of blocks 703 are not limited to any particular example. According to an exemplary embodiment, a different permutation pattern may be applied to each column. The frequency interleaving 1225 is performed by the frequency interleaver 1103 of the transmitter side apparatus 1100.

At the receiver side, frequency de-interleaving (e.g. block-wise frequency de-interleaving) is performed by the frequency de-interleaver 1153 of the receiver side apparatus 1150 and de-mapping (e.g. block-wise zig-zag de-mapping) is performed by the de-mapper 1151 of the receiver side apparatus 1150 to recover the original cells $f_i$.

In the example illustrated in FIG. 7, the cells $f_i$ are MIXO pre-coded in pairs such that pairs of cells $f_{2j}$ and $f_{2j+1}$, j=0, 1, 2, ..., K/2-1, are pre-coded together. The grid 700 is divided into 2×1 blocks 703 (comprising two rows and one column). Zig-zag mapping is applied block-wise using 2×1 blocks 703 in the manner described above, and then frequency interleaving is performed block-wise on the 2×1 blocks 703. In this example, since cells of a group of pre-coded cells are mapped to the same block 703, and frequency interleaving is performed on a block-wise basis, the cells of the group of pre-coded cells remain together, even following frequency interleaving.

The skilled person will appreciate that the embodiments described above may apply zig-zag mapping or zig-zag type mapping, thereby maintaining certain benefits of zig-zag mapping, for example greater time diversity and greater resilience to impulsive noise. Furthermore, the skilled person will appreciate that the embodiments described above are able to apply pre-coding to cells before the steps of mapping and frequency interleaving, thereby providing greater flexibility since the techniques may be applied to systems, for example DVB-NGH, in which frequency interleaving is performed after pre-coding.

Figure 8:
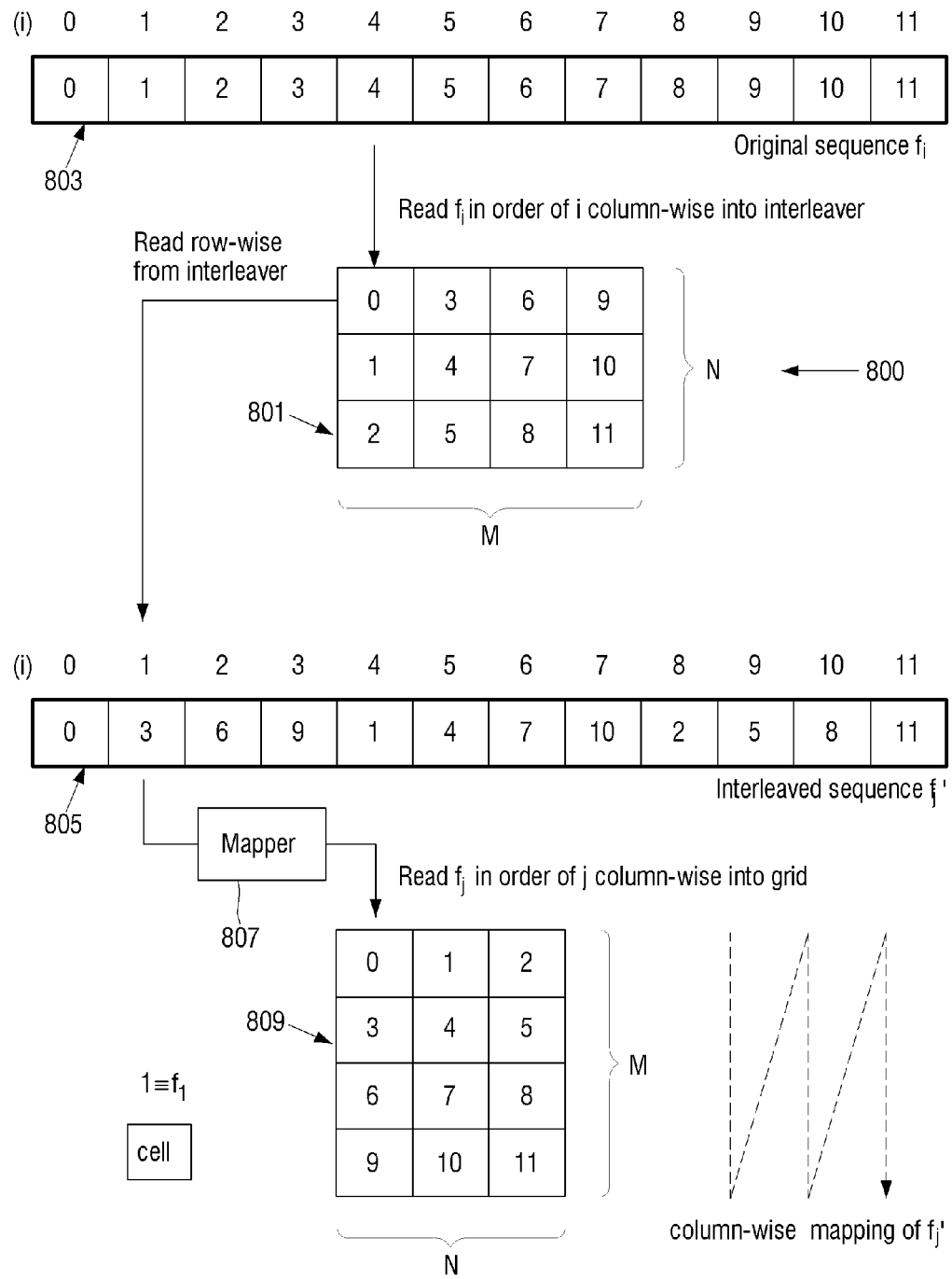
FIG. 8 illustrates a scheme for achieving mapping according to a zig-zag configuration without performing mapping on a row-wise basis, according to an exemplary embodiment.
Figure 13:
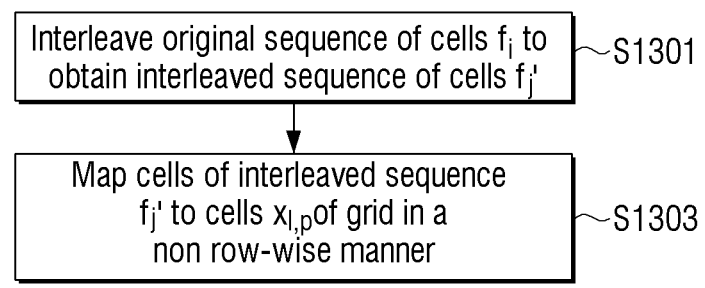
FIG. 13 illustrates a method for implementing the scheme illustrated in FIG. 8, according to an exemplary embodiment.

According to an exemplary embodiment, cells $f_i$ are mapped to cells $x_{l,p}$ in a zig-zag configuration, such that the ith cell $f_i$, i=0, 1, 2, ..., K-1 is mapped to cell $x_{l,p}$ in the lth column and pth row of the grid l=0, 1, 2, ..., N-1; p=0, 1, 2, ..., M-1, where l=i mod N and p=⌊i/N⌋. When performing this type of mapping, the mapping may be applied row-wise such that mapping is completed on a particular row before proceeding to the next row (i.e. the cells $f_i$ are mapped according to the above mapping in order of FIG. 8 illustrates an apparatus which allows cells $f_i$, to be mapped to cells $x_{l,p}$ to achieve the aforementioned zig-zag mapping, but without performing mapping on a row-wise basis (including, but not limited to performing mapping on a column-wise basis). FIG. 13 illustrates an exemplary method for implementing the scheme illustrated in FIG. 8.

As illustrated in FIG. 8, the apparatus 800 comprises an interleaver 801 for interleaving the sequence of cells 803 $f_i$, i=0, 1, 2, ..., K-1, to generate an interleaved sequence of cells 805 $f'_i$, i=0, 1, 2, ..., K-1, and a mapper 807 for mapping cells of the interleaved sequence $f'_i$ 805 to cells $x_{l,p}$ of the grid 809, without performing mapping in a row-wise manner.

In a first step 1301, the interleaver 801 is configured for permuting the original sequence of cells 803, for example such that the ith cell of the original sequence of cells 803 $f_i$, i=0, 1, 2, ..., K-1 is permuted to position j in the interleaved sequence of cells 805 $f'_j$, j=0, 1, 2, ..., K-1, where j=nM+m, and where n=i mod N and m=⌊i/N⌋. According to an exemplary embodiment, the interleaver 801 may be implemented in the form of a block interleaver having N rows and M columns, wherein values may be read into the interleaver 801 column by column, while values may be read out from the interleaver 801 row by row. The original sequence of cells 803 $f_i$ is read column by column into the interleaver 801, and the interleaved sequence of cells 805 $f'_j$ is obtained by reading values row by row from the interleaver 801.

In a next step 1303, the mapper 807 is configured for mapping cells of the interleaved sequence 805 $f'_j$ to cells $x_{l,p}$ of the grid 809 in a non-row-wise manner, for example such that the jth cell of the interleaved sequence 805 $f'_j$, j=0, 1, 2, ..., K-1 is mapped to cell $x_{l,p}$ in the lth column and pth row of the grid 809 l=0, 1, 2, ..., N-1; p=0, 1, 2, ..., M-1, where l=⌊j/M⌋ and p=j mod M. The cells of the interleaved sequence 805 $f'_i$ may be mapped in order of j. Thus, the cells of the interleaved sequence 805 $f'_j$ are mapped to cells $x_{l,p}$ of the grid 809 in a column-wise manner, rather than in a row-wise manner.

According to an exemplary embodiment, each cell $f_i$ may carry information modulated using a particular modulation scheme, for example QAM, PSK or ASK. In this case, the interleaver 801 of FIG. 8 may be in the form of a symbol interleaver. According to an exemplary embodiment, the sequence of cells $f_i$ comprises a sequence of bits. For example, each cell $f_i$ may comprise a BPSK modulated value. In this case, the interleaver 801 of FIG. 8 may be in the form of a bit interleaver.

The skilled person will appreciate that, by performing interleaving on the sequence of cells $f_i$ before performing mapping, the embodiments of the inventive concept may achieve greater flexibility. For example, the interleaver 801 may be configured to interleave the cells according to a wide variety of interleaving functions, thereby enabling a wide variety of mapping schemes, even if the mapper 807, by itself, is restricted to a relatively small number of mapping schemes.

For example, in an alternative embodiment, the step of interleaving may comprises the steps of: reading cells of the sequence of cells $f_i$ sequentially into columns of an interleaver of size N' by M', wherein N'×M'=N×M, and wherein N' is prime with respect to N (e.g. N' mod N≠0) or alternatively max(N,N') is prime with respect to min(N,N'); and sequentially reading rows of the interleaver to obtain the interleaved sequence of cells $f'_j$. In this example, the interleaving and mapping does not, in general, lead to the same zig-zag result as the specific example shown in FIG. 8. However, according to an exemplary embodiment, the aforementioned alternative interleaving scheme may provide better performance than using the specific interleaving scheme shown in FIG. 8.

The skilled person will appreciate that the mapping scheme described in relation to FIGS. 8 and 13 may be used in conjunction with various other exemplary embodiments of the inventive concept, including the embodiments described in relation to FIGS. 4 to 7, 11 and FIGS. 12a-12c. For example, the interleaver 801 and mapper 807 illustrated in FIG. 8 may replace the mapper 1101 illustrated in FIG. 11. In this case, the de-mapper 1151 illustrated in FIG. 11 may be replaced with a de-mapper and de-interleaver corresponding to the mapper and interleaver illustrated in FIG. 8, for performing de-mapping and de-interleaving corresponding to the mapping and interleaving schemes applied at the transmitter side. For example, the de-mapper and de-interleaver may perform a process that is essentially the reverse of the process illustrated in FIG. 8.

Furthermore, the mapping scheme described in relation to FIG. 8 may be used independently to achieve mapping of cells 803 $f_i$, to cells $x_{l,p}$ of the grid 809 in a zig-zag configuration without performing mapping in a row-wise manner.

Although the embodiments described above may apply zig-zag mapping or zig-zag type mapping in a certain direction (e.g. the zig-zag moving from left to right and from top to bottom), the skilled person will appreciate that zig-zag mapping or zig-zag type mapping may be applied in any other suitable direction (e.g. the zig-zag moving from right to left and/or moving top to bottom or bottom to top). The skilled person will also appreciate that, in the embodiments described above, zig-zag mapping or zig-zag type mapping is not essential.

Figure 14:
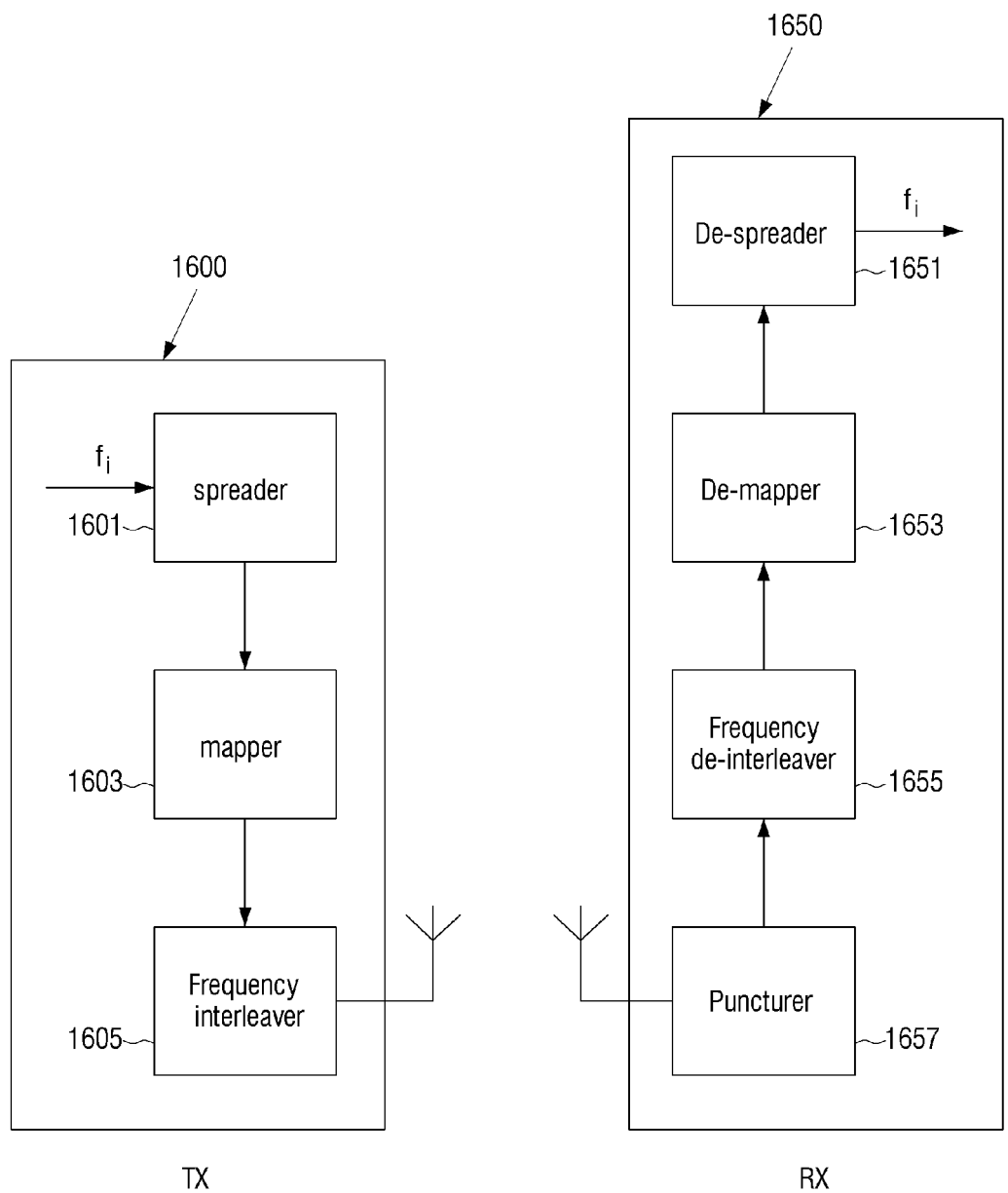
FIG. 14 illustrates an apparatus for implementing the schemes illustrated in FIG. 9 and FIGS. 10a-10c, according to an exemplary embodiment.
Figure 15:
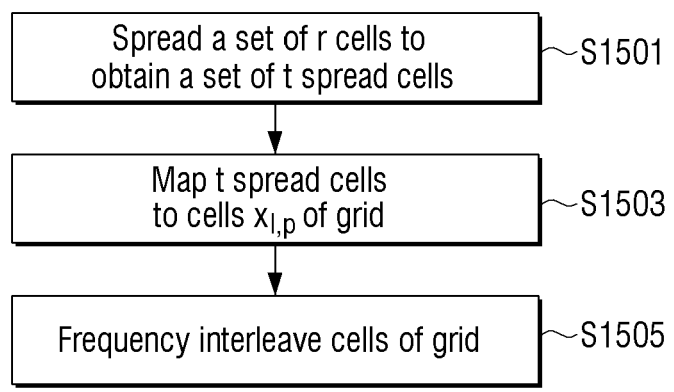
FIG. 15 illustrates an exemplary method for implementing the schemes illustrated in FIGS. 9 and FIGS. 10a-10c, according to an exemplary embodiment.

FIGS. 9 and FIGS. 10a-10c illustrate further exemplary embodiments which may achieve certain benefits of zig-zag mapping or zig-zag type mapping, for example greater time diversity and greater resilience to impulsive noise, without requiring zig-zag mapping. FIGS. 14 and 15 illustrate an exemplary system (e.g. a DVB system comprising a DVB transmitter apparatus and/or a DVB receiver apparatus) and method for implementing the schemes illustrated in FIGS. 9 and FIGS. 10a-10c. The skilled person will appreciate that FIG. 14 schematically illustrates only those components relating to the schemes illustrated in FIGS. 9 and FIGS. 10a-10c, and that the apparatus illustrated in FIG. 14 may comprise one or more additional components in various embodiments.

In these embodiments, a spreading process is performed on a set of rcells (first cells) 901 such that each cell 903 of the rcells 901 is divided into two or more chips. For example, each cell 903 of the r cells 901 may be divided into s chips. A chip may be regarded as a signal carrying partial information with respect to the information carried by a complete cell 903, wherein the chips derived from a particular cell may be combined together to recover the original information carried by that cell. The chips are then used to form a set of t spread cells (second cells) 905 such that each spread cell 907 is formed by combining a number of chips derived from the original set of rcells 901. The spread cells 905 may be formed such that the chips derived from each of the original cells 901 are distributed to at least two different spread cells 907. Each spread cell 907 may comprise one or more chips derived from the same original cell 903. As shown in FIG. 15, in a first step 1501, the set of rcells are spread to obtain a set of t spread cells. The spreading is performed by a spreader 1601 of a transmitter side apparatus 1600.

In a next step 1503, the t spread cells 905 are then mapped to cells $x_{l,p}$ of the grid, and in a next step 1505, frequency interleaving is performed, such that, following the step of frequency interleaving, the t spread cells 905 are each mapped to carriers having the same carrier frequency or to carriers having carrier frequencies differing by no more than a threshold. The mapping is performed by a mapper 1603 of the transmitter side apparatus 1600 and the frequency interleaving is performed by a frequency interleaver 1605 of the transmitter side apparatus 1600.

The spreading process described above for forming a set of t spread cells 905 from a set of r original cells 901 may be regarded as a form of pre-coding, and the set of t spread cells 905 may be regarded as cells of a group of pre-coded cells.

In the examples illustrated in FIGS. 9 and FIGS. 10a-10c, a set of r cells 901 are spread using r Code Division Multiple Access (CDMA) codes to generate r chips for each cell 903. The CDMA codes may comprise, for example, Hadamard codes. A set of r spread cells 905 are formed such that each spread cell 907 comprises one chip from each of the r original cells 901. This spreading process is illustrated schematically in FIG. 9. The value of r may be referred to as a spreading factor (SF). According to an exemplary embodiment, the spreading factor may be equal to N. In other exemplary embodiments, the spreading factor may be less than N (for example, N may be an integer multiple of the spreading factor).

Figure 10A:
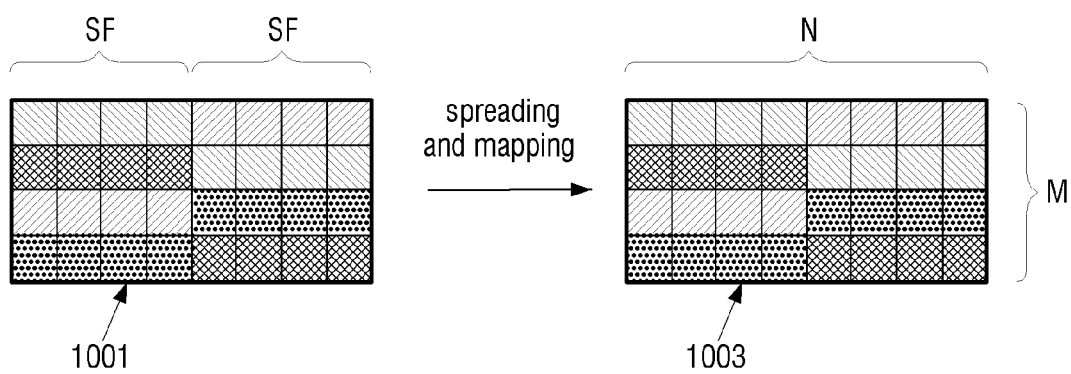
FIG. 10a illustrates a mapping and interleaving scheme for mapping spread cells to symbols, and a corresponding de-mapping and de-interleaving scheme, according to an exemplary embodiment.
Figure 10B:
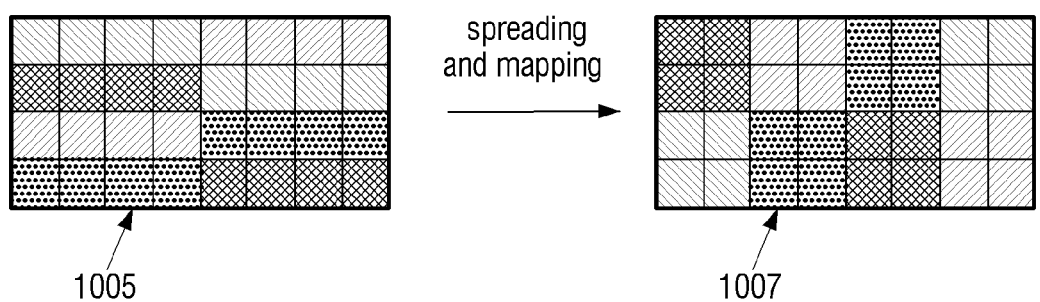
FIG. 10b illustrates a mapping and interleaving scheme for mapping spread cells to symbols, and a corresponding de-mapping and de-interleaving scheme, according to an exemplary embodiment.
Figure 10C:
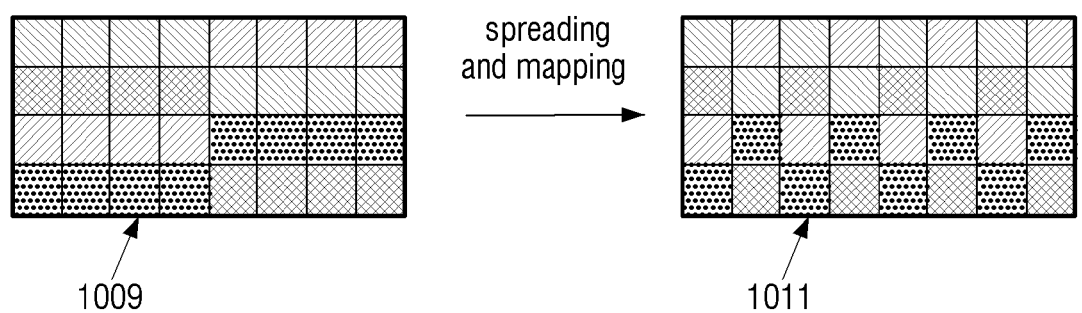
FIG. 10c illustrates a mapping and interleaving scheme for mapping spread cells to symbols, and a corresponding de-mapping and de-interleaving scheme, according to an exemplary embodiment.

FIGS. 10a-10c illustrate various mapping schemes for mapping the spread cells to cells of a grid. In these examples, eight sets of four cells are spread to form eight respective sets of four spread cells 1003, 1007, 1011. Furthermore, values of N=8 and M=4 are used, and the spreading factor is equal to N/2. The skilled person will appreciate that the inventive concept is not limited to these specific examples.

According to an exemplary embodiment as shown in FIG. 10a, the spread cells of each set of spread cells 1003 are mapped to a line of adjacent cells of the grid in the same row. In this case, frequency interleaving is performed such that the columns of the grid containing spread cells of a set of spread cells 1003 are frequency interleaved using the same permutation pattern. In this way, following frequency interleaving, the spread cells of a set of spread cells 1003 will remain in the same row of the grid. According to an exemplary embodiment, the same permutation pattern may be applied to all columns.

According to an exemplary embodiment as shown in FIG. 10*b*, the spread cells of each set of spread cells 1007 are mapped to a contiguous block of cells of the grid. In FIG. 10*b*, the spread cells of each set of spread cells 1007 are mapped to cells forming a 2×2 block of cells comprising two rows and two columns. According to another exemplary embodiment, a different block size may be used. Frequency interleaving is then performed block-wise on the continuous blocks. The permutation pattern applied to each vertical arrangement of blocks is not limited to any specific embodiment. For example, permutation patterns corresponding to those used in the embodiment illustrated in FIG. 4 may be used. In this way, following frequency interleaving, the spread cells of a set of spread cells 1007 will remain together in a contiguous block.

According to an exemplary embodiment as shown in FIG. 10*c*, the spread cells of each set of spread cells 1011 are mapped to a block of non-contiguous cells of the grid. In FIG. 10*c*, the cells of each set of spread cells 1011 may be mapped to a set of regularly spaced cells within the same row of the grid (for example, a set of cells located in odd-numbered columns or a set of cells located in even-numbered columns, as illustrated in FIG. 10*c*). In this case, frequency interleaving is performed such that the columns of the grid containing spread cells of a set of spread cells 1011 are frequency interleaved using the same permutation pattern. For example, in the example illustrated in FIG. 10*c*, a first permutation pattern is used for odd-numbered columns and a second permutation pattern is used for even-numbered columns. In this way, following frequency interleaving, the spread cells of a set of spread cells 1011 will remain in the same row of the grid.

At the transmitter side, following spreading and mapping of the cells, the signal is transmitted to a receiver side. At the receiver, the received signal is frequency de-interleaved, using a scheme corresponding to the interleaving scheme used at the transmitter side, to recover a group of cells to which spread cells are mapped. The frequency de-interleaving is performed by a frequency de-interleaver 1655 of a receiver side apparatus 1650. The spread cells mapped to the grid are then de-mapped, using a scheme corresponding to the mapping scheme used at the transmitter side, to obtain one or more sets of spread cells. The de-mapping is performed by a de-mapper 1653 of the receiver side apparatus 1650. Each set of spread cells are then de-spread, using a scheme corresponding to the spreading scheme used at the transmitter side, to recover respective sets of cells. The de-spreading is performed by a de-spreader 1651 of the receiver side apparatus 1650. The information carried by the de-spread cells may then be extracted using any suitable technique.

At the receiver side, the following process may be carried out optionally to deal with impulsive noise. First, it is determined whether each symbol (i.e. column of the grid) is affected by noise exceeding a certain level. For example, an average power level taken over all carriers of a symbol may be measured, and any symbols for which the average power level exceeds a certain threshold are assumed to be symbols affected by noise exceeding a certain level. Symbols affected by noise exceeding a certain level are likely to be corrupted. Therefore, any symbols determined to be affected by noise exceeding a certain level are subjected to a puncturing-type process. For example, a corresponding channel may be set to zero when performing detection of any symbols affected by noise exceeding a certain level. The above process is performed by a puncturer 1657 of the receiver side apparatus 1650.

By using the technique described above, since the information content of an original cell is spread over several spread cells before transmission, the information content of the original cell may still be recovered from spread cells mapped to symbols not corrupted by impulsive noise. For example, if one out of eight of the spread cells illustrated in FIG. 9 is corrupted by impulsive noise, then ⅞ of the information carried by each original cell is still recoverable.

It will be appreciated that the above embodiments of the inventive concept can be realized in the form of hardware, software or a combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain embodiments of the present invention. Accordingly, certain embodiments provide a program comprising code for implementing a method, apparatus or system as claimed in any one of the claims of this specification, and a machine-readable storage storing such a program. Still further, such programs may be conveyed electronically via any medium, for example a communication signal carried over a wired or wireless connection, and embodiments suitably encompass the same.

While the inventive concept has been shown and described with reference to certain exemplary embodiments thereof, it will be understood by those skilled in the art that various changes in form and detail may be made therein without departing from the scope of the inventive concept, as defined by the appended claims.

What is claimed is:

1. A method for mapping cells onto symbols, wherein the cells comprise two or more cells processed by pre-coding in groups, the symbols comprise N symbols in a time-sequence, and each symbol comprises M carriers in a frequency-order, where each of N and M is an integer greater than 0, the method comprising:
    mapping each cell to a carrier of a symbol; and
    frequency interleaving the carriers of each symbol,
    wherein the mapping and the frequency interleaving are performed such that, following the frequency interleaving, the cells of a group of pre-coded cells are each mapped to carriers having the same carrier frequency or to carriers having carrier frequencies differing by no more than a threshold.

2. The method according to claim 1, wherein the pre-coding comprises
    one of Multiple-Input-Multiple-Output (MIMO) and Multiple-Input-Single-Output (MISO).

3. The method according to claim 1,
    wherein the mapping each cell to a carrier of a symbol is performed such that, prior to the frequency interleaving, the cells of a group of pre-coded cells are each mapped to carriers within a block of carriers comprising x consecutive carriers of y consecutive symbols, where each of x and y is an integer greater than 0, and
wherein the frequency interleaving comprises performing block-wise frequency interleaving on blocks of carriers comprising x' consecutive carriers of y' consecutive preamble symbols, where x' is equal to x or an integer multiple of x, and y' is equal to y or an integer multiple of y.

4. The method according to claim 3, wherein the cells of a group of pre-coded cells are each mapped to carriers having the same carrier frequency of y consecutive symbols.

5. The method according to claim 3, wherein mapping comprises mapping each cell to a carrier of a symbol in a zig-zag configuration, such that an ith cell is mapped to an mth carrier of an nth symbol, where $n=i \bmod N$ and $m=\lfloor i/N \rfloor$, where $\lfloor \ \rfloor$ is a floor operator, i is equal to or greater than 0, and each of m, n and N is an integer greater than 0.

6. The method according to claim 3, wherein x=y or x=1, y=2 or y=4.

7. The method according to claim 1, wherein the mapping comprises mapping cells of a group of pre-coded cells to a set of carriers comprising carriers:
  (i) having the same carrier frequency or having the carrier frequencies differing by no more than the threshold; and
  (ii) belonging to a set of symbols that are frequency interleaved using the same permutation pattern.

8. The method according to claim 7,
  wherein the interleaving comprises performing frequency interleaving on two or more sets of symbols using two or more respective permutation patterns, and
  wherein the mapping comprises:
    dividing the cells into two or more groups of cells; and
    mapping the two or more groups of cells to carriers of the respective two or more sets of symbols.

9. The method according to claim 8, wherein a first set of symbols comprise even-numbered symbols and a second set of symbols comprise odd-numbered symbols.

10. The method according to claim 9,
  wherein the cells comprise a sequence of cells $c_i$, where i is an integer equal to or greater than 0,
  wherein a first group of cells comprise cells satisfying i MOD N<N/2, and a second group of cells comprise cells satisfying i MOD N≥N/2, where N is an integer greater than 0,
  wherein the mapping comprises:
    reading cells of the first group of cells sequentially into columns of a first interleaver of size N/2 by M;
    reading cells of the second group of cells sequentially into columns of a second interleaver of size N/2 by M;
    reading rows of the first and second interleavers alternately;
    mapping rows of cells read out from the first interleaver to carriers of the even-numbered symbols; and
    mapping rows of cells read out from the second interleaver to carriers of the odd-numbered symbols.

11. The method according to claim 10, wherein the first and second interleavers are block interleavers.

12. The method according to claim 1,
  wherein the mapping comprises mapping x cells of a group of pre-coded cells to a set of x consecutive carriers of a symbol, where x is an integer greater than 0; and
  wherein the frequency interleaving comprises performing group-wise frequency interleaving on groups of carriers comprising x' consecutive carriers of each preamble symbol, where is equal to x' or an integer multiple of x.

13. The method according to claim 12, wherein the mapping comprises mapping each cell to a carrier of a symbol in a group-wise zig-zag configuration, such that an (xi+j)th cell is mapped to the $m_j$th carrier of the $n_j$th symbol, where $n_j=i \bmod N$ and $m_j=x\lfloor i/N \rfloor+j$, where $\lfloor \ \rfloor$ is a floor operator, each of i and j is an integer equal to or greater than 0, and each of m, n and N is an integer greater than 0.

14. The method according to claim 12,
  wherein x=2,
  wherein the mapping comprises mapping each cell to a carrier of a symbol in a pair-wise zig-zag configuration, such that:
    a 2ith cell is mapped to an $m_1$th carrier of an $n_1$th symbol, where $n_1=i \bmod N$ and $m_1=2\lfloor i/N \rfloor$, and
    a (2i+1)th cell is mapped to an $m_2$th carrier of an $n_2$th symbol, where $n_2=i \bmod N$ and $m_2=2\lfloor i/N \rfloor+1$,
  where $\lfloor \ \rfloor$ is a floor operator, each of i and j is an integer equal to or greater than 0, and each of m, n and N is an integer greater than 0.

15. The method according to claim 1, wherein the cells of a group of pre-coding cells comprise a pre-coding pair of cells.

16. The method according to claim 1, wherein the cells comprise at least one cell that has not undergone pre-coding or at least one cell that has undergone Single-Input-Single-Output (SISO) pre-coding.

17. The method according to claim 1, wherein the cells comprise a sequence of cells, and
  wherein the mapping comprises:
    (a) interleaving the sequence of cells to obtain an interleaved sequence of cells;
    (b) mapping a first set of M sequential cells of the interleaved sequence of cells to M respective carriers of a first symbol, where M is an integer greater than 0; and
    (c) repeating operations (a) and (b) based on successive sets of M sequential cells and successive symbols.

18. The method according to claim 17, wherein operations (a) and (b) are performed such that an ith cell of the sequence of cells is mapped to an mth carrier of an nth symbol, where $n=i \bmod N$ and $m=\lfloor i/N \rfloor$, where $\lfloor \ \rfloor$ is a floor operator, i is an integer equal to or greater than 0, and each of m, n and N is an integer greater than 0.

19. The method according to claim 17, wherein operation (a) is performed such that an ith cell of the sequence of cells is permuted to position j in the interleaved sequence of cells, where $j=nM+m$, $n=i \bmod N$, $m=\lfloor i/N \rfloor$, each of i and j is an integer equal to or greater than 0, and each of m, n and N is an integer greater than 0.

20. The method according to claim 1, further comprising pre-coding the group of cells, wherein the pre-coding comprises spreading a set of first cells such that each first cell is divided into two or more chips,
  wherein the chips are used to form a set of second cells such that each second cell is formed by combining a number of chips derived from the set of first cells such that the chips derived from each of the first cells are distributed to at least two different second cells, and
  wherein the pre-coded group of cells comprises the set of second cells.

21. A method for de-mapping cells from symbols, wherein the cells comprise two or more cells processed by pre-coding in groups, the symbols include N symbols in a time-sequence, and each symbol comprises M carriers in a frequency-order, where each of N and M is an integer greater than 0, the method comprising:

frequency de-interleaving the carriers of each symbol; and de-mapping cells from carriers of each symbol, wherein, prior to the frequency de-interleaving, the cells of a group of pre-coded cells are each mapped to carriers having the same carrier frequency or to carriers having carrier frequencies differing by no more than a threshold.

22. An apparatus for mapping cells onto symbols, wherein the cells comprise two or more cells processed by pre-coding in groups, the symbols comprise N symbols in a time-sequence, and each symbol includes M carriers in a frequency-order, where each of N and M is an integer greater than 0, the apparatus comprising:

a mapper configured to map each cell to a carrier of a symbol; and a frequency interleaver configured to frequency interleave the carriers of each symbol, wherein the mapper and the frequency interleaver perform the mapping and the frequency interleaving such that, following the frequency interleaving, the cells of a group of pre-coded cells are each mapped to carriers having the same carrier frequency or to carriers having carrier frequencies differing by no more than a threshold.

* * * * *